United States Patent
Kim et al.

(10) Patent No.: US 10,396,877 B2
(45) Date of Patent: Aug. 27, 2019

(54) METHOD FOR REPORTING CSI IN WIRELESS COMMUNICATION SYSTEM AND APPARATUS THEREFOR

(71) Applicant: LG ELECTRONICS INC., Seoul (KR)

(72) Inventors: Hyungtae Kim, Seoul (KR); Jonghyun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/763,800

(22) PCT Filed: Jun. 13, 2016

(86) PCT No.: PCT/KR2016/006258
§ 371 (c)(1),
(2) Date: Mar. 27, 2018

(87) PCT Pub. No.: WO2017/115948
PCT Pub. Date: Jul. 6, 2017

(65) Prior Publication Data
US 2018/0278313 A1    Sep. 27, 2018

Related U.S. Application Data

(60) Provisional application No. 62/273,439, filed on Dec. 31, 2015, provisional application No. 62/291,488, (Continued)

(51) Int. Cl.
*H04B 7/02*    (2018.01)
*H04B 7/06*    (2006.01)
(Continued)

(52) U.S. Cl.
CPC ............. *H04B 7/0626* (2013.01); *H04B 7/04* (2013.01); *H04B 7/0413* (2013.01); *H04B 7/06* (2013.01); *H04L 5/0048* (2013.01); *H04L 5/0023* (2013.01)

(58) Field of Classification Search
CPC ...... H04B 7/0626; H04B 7/04; H04B 7/0413; H04B 7/06; H04L 5/0048; H04L 5/0023
(Continued)

(56) References Cited

U.S. PATENT DOCUMENTS

2013/0279361 A1\* 10/2013 Seo ..................... H04J 11/0053
                                                            370/252
2015/0023280 A1\* 1/2015 Kim ........................ H04B 7/04
                                                            370/329
2015/0288432 A1    10/2015 Kim et al.

FOREIGN PATENT DOCUMENTS

WO        2014163169        10/2014

OTHER PUBLICATIONS

PCT International Application No. PCT/KR2016/006258, Notification of Transmittal of the International Search Report and the Written Opinion of the International Searching Authority, or Declaration dated Sep. 23, 2016, 11 pages.
(Continued)

*Primary Examiner* — Zewdu A Kassa
(74) *Attorney, Agent, or Firm* — Lee Hong Degerman Kang Waimey

(57) ABSTRACT

A method for reporting channel status information (CSI) to a base station by a terminal in a wireless access system is disclosed in the present application. The method for reporting CSI comprises the steps of: receiving information on a first CSI process and a second CSI process, each of which includes two or more CSI-reference signal (CSI-RS) resources, through an upper layer; and transmitting, to the base station, a first CSI report according to the first CSI
(Continued)

process and a second CSI report corresponding to the second CSI process, wherein the second CSI process is configured to have a rank indicator (RI) value that is the same as the RI of the first CSI process, and the numbers of antenna ports for all the CSI-RS resources included in the first CSI process and the second CSI process are the same.

12 Claims, 17 Drawing Sheets

Related U.S. Application Data filed on Feb. 4, 2016, provisional application No. 62/293,750, filed on Feb. 10, 2016, provisional application No. 62/294,266, filed on Feb. 11, 2016.

(51) Int. Cl.
- *H04B 7/04* (2017.01)
- *H04B 7/0413* (2017.01)
- *H04L 5/00* (2006.01)

(58) Field of Classification Search
USPC .............. 375/267, 260, 259, 295, 316, 219
See application file for complete search history.

(56) References Cited

OTHER PUBLICATIONS

Samsung, "Elevation Beamforming/Full-Dimension (FD) MIMO for LTE", 3GPP TSG RAN Meeting #69, RP-151391, Sep. 2015, 8 pages.

3rd Generation Partnership Project (3GPP), "Technical Specification Group Radio Access Network; Study on Elevation Beamforming/Full-Dimension (FD) MIMO for LTE (Release 13)," 3GPP TR 36.897 V1.0.1, R1-153692, Jun. 2015, 58 pages.

* cited by examiner

FIG. 5
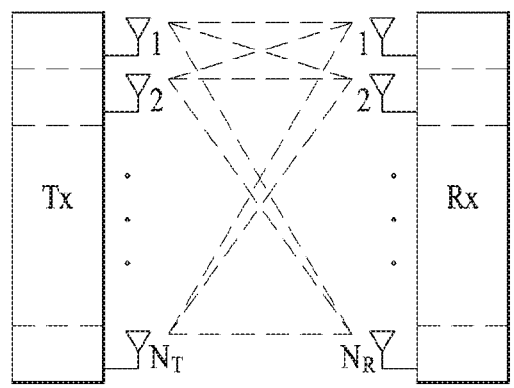
(a)
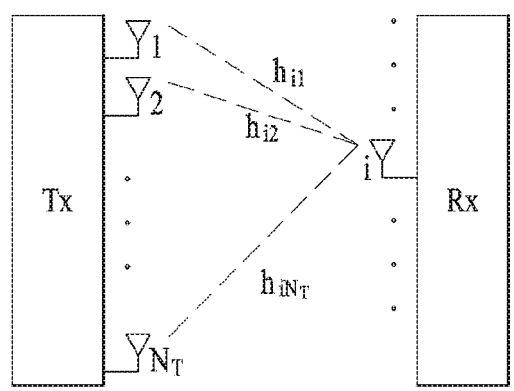
(b)

FIG. 16
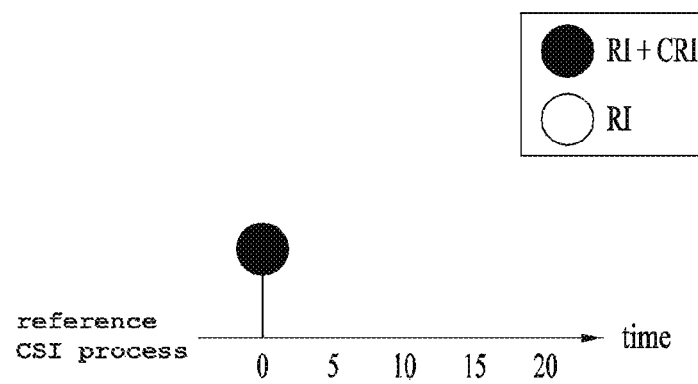
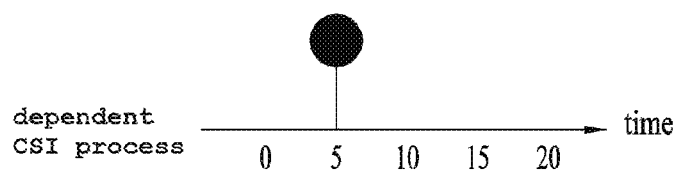
FIG. 17
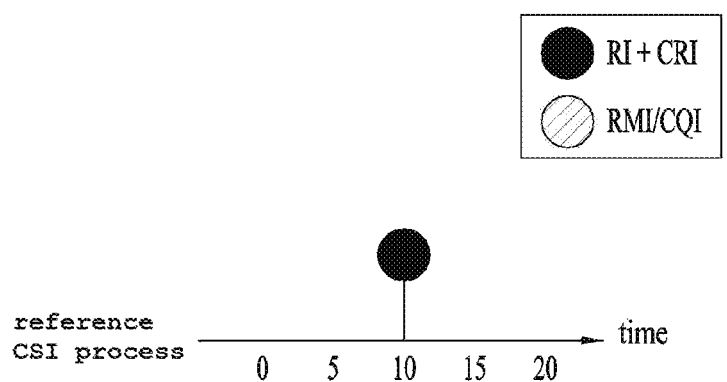
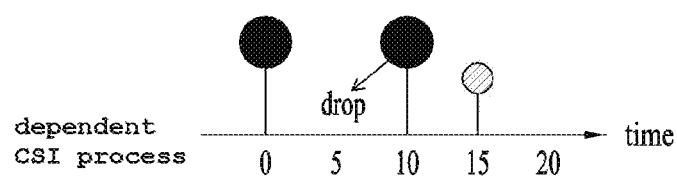

US 10,396,877 B2

METHOD FOR REPORTING CSI IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2016/06258, filed on Jun. 13, 2016, which claims the benefit of U.S. Provisional Application No. 62/273,439, filed on Dec. 31, 2015, 62/291,488, filed on Feb. 4, 2016, 62/293,750, filed on Feb. 10, 2016, and 62/294,266, filed on Feb. 11, 2016, the contents of which are all hereby incorporated by reference herein in its entirety.

TECHNICAL FIELD

The present invention relates to a wireless communication system, and more particularly, to a method of reporting CSI in a wireless communication system and an apparatus therefor.

BACKGROUND ART

MIMO (multi-input multi-output) technology corresponds to a technology for increasing data transmission and reception efficiency using a plurality of transmission antennas and a plurality of reception antennas instead of using a single transmission antenna and a single reception antenna. If a single antenna is used, a receiving end receives data through a single antenna path. On the contrary, if multiple antennas are used, the receiving end receives data through several paths, thereby enhancing transmission speed and transmission capacity and increasing coverage.

A single-cell MIMO operation can be divided into a single user-MIMO (SU-MIMO) scheme that a single user equipment (UE) receives a downlink signal in a single cell and a multi user-MIMO (MU-MIMO) scheme that two or more UEs receive a downlink signal in a single cell.

Channel estimation corresponds to a procedure of restoring a received signal by compensating a distortion of the signal distorted by fading. In this case, the fading corresponds to a phenomenon of rapidly changing strength of a signal due to multi-path time delay in wireless communication system environment. In order to perform the channel estimation, it is necessary to have a reference signal known to both a transmitter and a receiver. The reference signal can be simply referred to as an RS (reference signal) or a pilot depending on a standard applied thereto.

A downlink reference signal corresponds to a pilot signal for coherently demodulating PDSCH (physical downlink shared channel), PCFICH (physical control format indicator channel), PHICH (physical hybrid indicator channel), PDCCH (physical downlink control channel) and the like. A downlink reference signal can be classified into a common reference signal (CRS) shared by all UEs within a cell and a dedicated reference signal (DRS) used for a specific UE only. Compared to a legacy communication system supporting 4 transmission antennas (e.g., a system according to LTE release 8 or 9 standard), a system including an extended antenna configuration (e.g., a system according to LTE-A standard supporting 8 transmission antennas) is considering DRS-based data demodulation to efficiently manage a reference signal and support an enhanced transmission scheme. In particular, in order to support data transmission through an extended antenna, it may be able to define a DRS for two or more layers. Since a DRS and data are precoded by a same precoder, it is able to easily estimate channel information, which is used for a receiving end to demodulate data, without separate precoding information.

Although a downlink receiving end is able to obtain precoded channel information on an extended antenna configuration through a DRS, it is required for the downlink receiving end to have a separate reference signal except the DRS to obtain channel information which is not precoded. Hence, it is able to define a reference signal for obtaining channel state information (CSI), i.e., a CSI-RS, at a receiving end in a system according to LTE-A standard.

DISCLOSURE OF THE INVENTION

Technical Task

Based on the aforementioned discussion, a method of reporting CSI in a wireless communication system and an apparatus therefor are proposed in the following.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of reporting CSI (channel status information), which is reported by a user equipment (UE) to a base station in a wireless access system, includes the steps of receiving information on a first CSI process and a second CSI process, each of which includes two or more CSI-RS (channel status information-reference signal) resources, through an upper layer, and transmitting a first CSI report according to the first CSI process and a second CSI report corresponding to the second CSI process to the base station. In this case, the second CSI process is configured to have an RI value identical to an RI (rank indicator) of the first CSI process and the number of antenna ports of all CSI-RS resources included in the first CSI process is identical to the number of antenna ports of all CSI-RS resources included in the second CSI process.

In this case, independent beamforming can be applied to each of the two or more CSI-RS resources.

Preferably, the method can further include the step of receiving information on a CSI reporting type via the upper layer. In this case, the CSI reporting type can include information on whether or not the two or more CSI-RS resources are aggregated. In particular, in the CSI reporting method, the CSI reporting type may indicate that each of the two or more CSI-RS resources corresponds to an independent channel which is not combined.

To further achieve these and other advantages and in accordance with the purpose of the present invention, according to a different embodiment, a user equipment (UE) estimating a channel in a wireless communication system includes an RF (radio frequency) unit configured to transceive a signal with a base station, and a processor configured to process the signal, the processor configured to set a first CSI process and a second CSI process, each of which includes two or more CSI-RS (channel status information-reference signal) resources, through an upper layer, the processor configured to control the RF unit to transmit a first CSI report according to the first CSI process and a second CSI report corresponding to the second CSI process to the base station. In this case, the second CSI process is configured to have an RI value identical to an RI (rank indicator) of the first CSI process and the number of antenna ports of all CSI-RS resources included in the first CSI process is identical to the number of antenna ports of all CSI-RS resources included in the second CSI process. In this case, independent beamforming is applied to each of the two or more CSI-RS resources.

Additionally, it is preferable that the processor is configured to set a CSI reporting type via the upper layer and the CSI reporting type includes information on whether or not the two or more CSI-RS resources are aggregated. In this case, the CSI reporting type indicates that each of the two or more CSI-RS resources corresponds to an independent channel which is not combined.

More preferably, the first CSI process corresponds to a reference CSI process and the second CSI process corresponds to a dependent CSI process of the reference CSI process. In this case, a restriction RI set is common to all CSI-RS resources included in the first CSI process and the second CSI process.

Advantageous Effects

According to embodiments of the present invention, a UE is able to efficiently report CSI in a wireless communication system, i.e., a wireless communication system to which FD-MIMO or massive MIMO is applied.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 5 is a diagram for a configuration of a wireless communication system including a plurality of antennas;

FIG. 16 shows a second case that illustrates a relation between RI inheritance and CRI inheritance according to an embodiment of the present invention;

FIG. 17 shows a third case that illustrates a relation between RI inheritance and CRI inheritance according to an embodiment of the present invention;

BEST MODE

Mode for Invention

Figure 1:
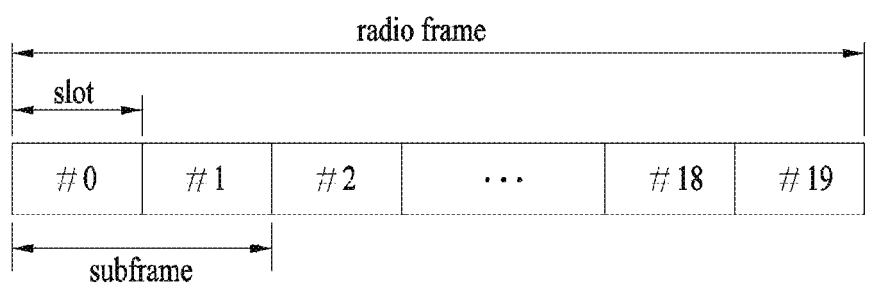
FIG. 1 is a diagram for a structure of a downlink radio frame.

The embodiments described in the following correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment.

In this specification, embodiments of the present invention are described centering on the data transmission/reception relations between a user equipment and an eNode B. In this case, the eNode B may correspond to a terminal node of a network directly performing communication with the user equipment. In this disclosure, a specific operation explained as performed by an eNode B may be performed by an upper node of the eNode B in some cases.

In particular, in a network constructed with a plurality of network nodes including an eNode B, it is apparent that various operations performed for communication with a user equipment can be performed by an eNode B or other networks except the eNode B. 'eNode B (eNB)' may be substituted with such a terminology as a fixed station, a Node B, a base station (BS), an access point (AP) and the like. A terminal may be substituted with such a terminology as a relay node (RN), a relay station (RS), and the like. And, a terminal may be substituted with such a terminology as a user equipment (UE), a mobile station (MS), a mobile subscriber station (MSS), and the like.

Specific terminologies used in the following description are provided to help understand the present invention and the use of the specific terminologies can be modified into a different form in a range of not deviating from the technical idea of the present invention.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Embodiments of the present invention may be supported by the standard documents disclosed in at least one of wireless access systems including IEEE 802 system, 3GPP system, 3GPP LTE system, 3GPP LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description of embodiments of the present invention may be usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in downlink (hereinafter abbreviated DL) and SC-FDMA in uplink (hereinafter abbreviated UL). And, LTE-A (LTE-Advanced) is an evolved version of 3GPP LTE. WiMAX may be explained by IEEE 802.16e standard (e.g., WirelessMAN-OFDMA reference system) and advanced IEEE 802.16m standard (e.g., WirelessMAN-OFDMA advanced system). For clarity, the following description mainly concerns 3GPP LTE and LTE-A standards, by which the technical idea of the present invention may be non-limited.

A structure of a downlink radio frame is explained in the following with reference to FIG. 1.

Referring to FIG. 1, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 1 is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol period. The OFDM symbol may be referred to as SC-FDMA symbol or symbol period. The resource block (RB) as a resource allocation unit may include a plurality of continuous subcarriers in one slot.

The number of OFDM symbols included in one slot may vary depending on a configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first two or three OFDM symbols of each subframe may be allocated to a physical downlink control channel (PDCCH), and the other OFDM symbols may be allocated to a physical downlink shared channel (PDSCH).

The aforementioned structure of a radio frame is just an example only. The number of subframes included in a radio frame, the number of slots included in a subframe and the number of symbols included in a slot may be modified in various ways.

Figure 2:
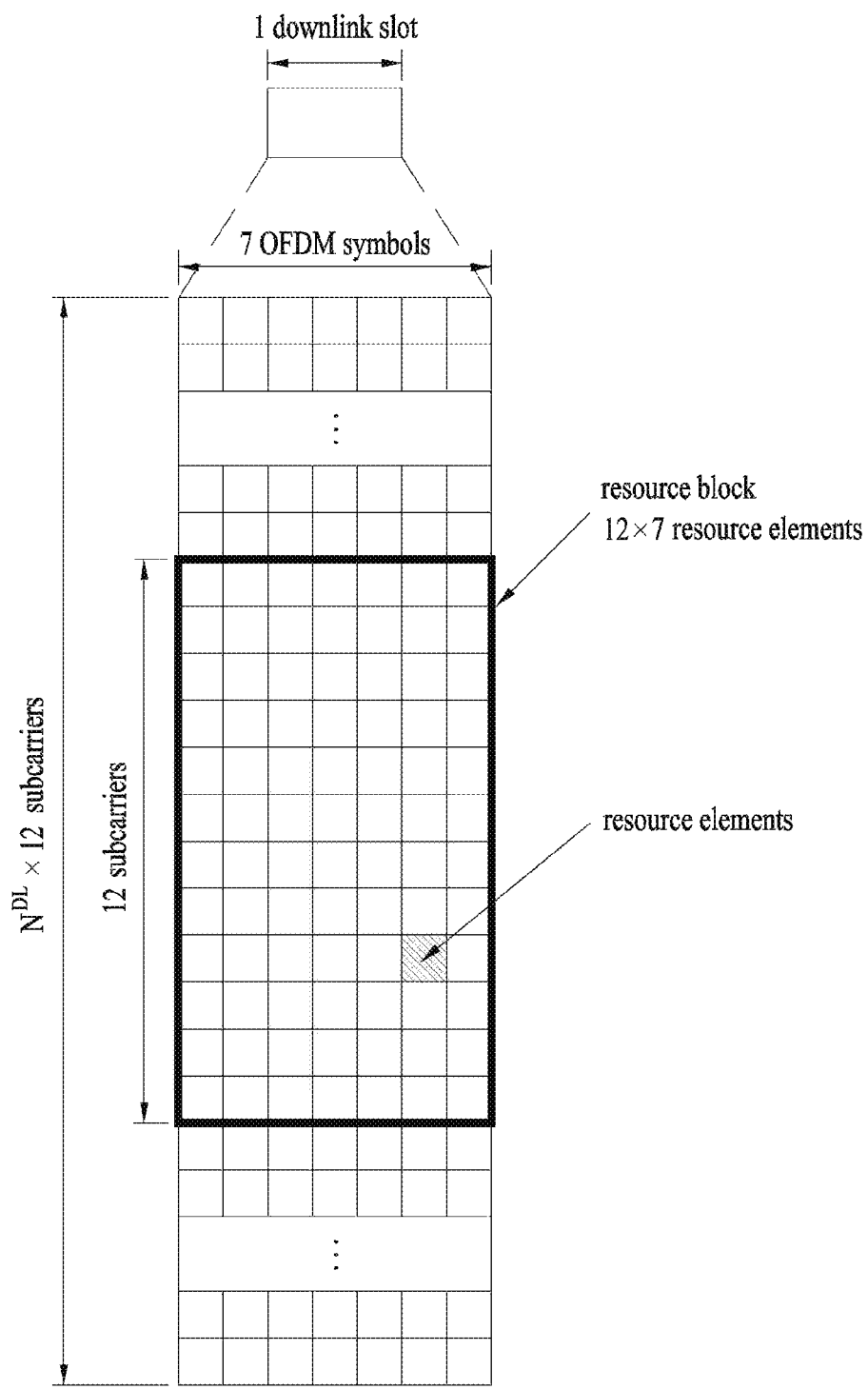
FIG. 2 is a diagram for an example of a resource grid of a downlink slot.

FIG. 2 is a diagram for an example of a resource grid of a downlink slot. FIG. 2 shows a case that an OFDM symbol is configured by a normal CP. Referring to FIG. 2, a downlink slot includes a plurality of OFDM symbols in a time domain and a plurality of resource blocks in a frequency domain. In this case, although FIG. 2 illustrates that a downlink slot includes seven OFDM symbols and a resource block includes twelve subcarriers, by which the present invention may be non-limited. Each element on the resource grid will be referred to as a resource element (RE). For example, an RE a (k, 1) may correspond to an RE positioned at a kth subcarrier and an lth OFDM symbol. In case of a normal CP, one resource block includes 12*7 resource elements (in case of an extended CP, one resource block includes 12*6 resource elements). Since a space between subcarriers corresponds to 15 kHz, one resource block includes about 180 kHz in frequency domain. NDL corresponds to the number of resource blocks included in a downlink slot. A value of the NDL can be determined according to a downlink transmission bandwidth scheduled by a base station.

Figure 3:
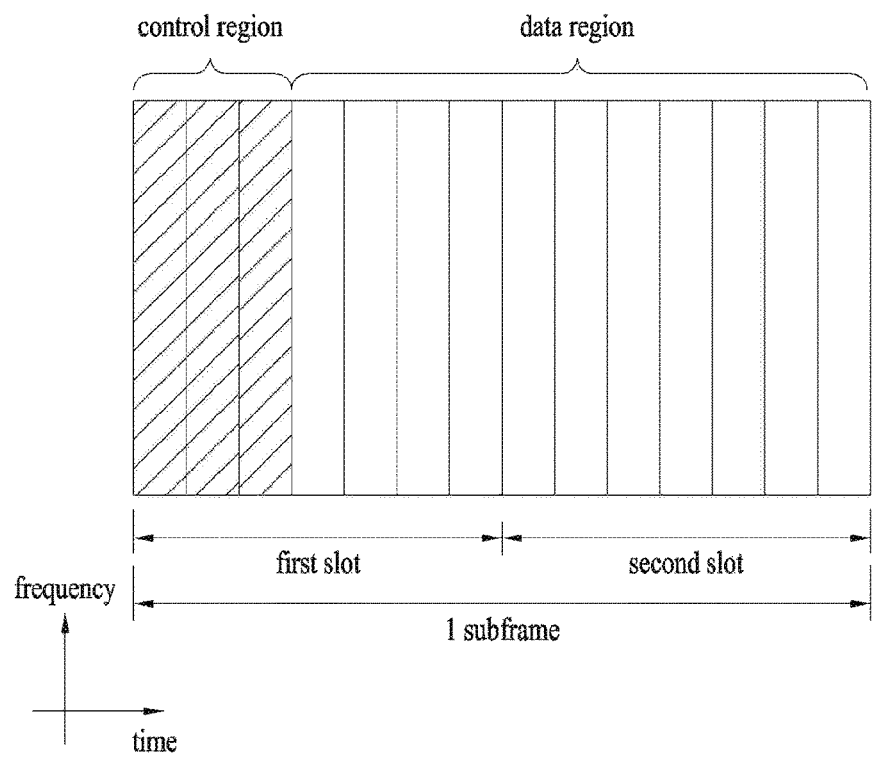
FIG. 3 is a diagram for structure of a downlink subframe.

FIG. 3 is a diagram illustrating a structure of a downlink subframe. Referring to FIG. 3, maximum three OFDM symbols located at the front of the first slot of a subframe correspond to a control region to which a control channel is allocated. The other OFDM symbols correspond to a data region to which a physical downlink shared channel (PDSCH) is allocated. A basic unit of transmission becomes one subframe. In particular, PDCCH and PDSCH are assigned over two slots. Examples of downlink control channels used in the 3GPP LTE system include a Physical Control Format Indicator Channel (PCFICH), a Physical Downlink Control Channel (PDCCH), and a Physical Hybrid ARQ Indicator Channel (PHICH). The PCFICH is transmitted from the first OFDM symbol of the subframe, and carries information on the number of OFDM symbols used for transmission of the control channel within the subframe. The PHICH carries HARQ ACK/NACK signals in response to uplink transmission. The control information transmitted through the PDCCH will be referred to as downlink control information (DCI). The DCI includes uplink or downlink scheduling information, uplink transmission (Tx) power control command for a random UE group and the like. The PDCCH may include transport format and resource allocation information of a downlink shared channel (DL-SCH), transport format and resource allocation information of an uplink shared channel (UL-SCH), paging information on a paging channel (PCH), system information on the DL-SCH, resource allocation information of upper layer control message such as random access response transmitted on the PDSCH, a set of transmission (Tx) power control commands of individual user equipments (UEs) within a random user equipment group, transmission (Tx) power control command, and activity indication information of voice over Internet protocol (VoIP). A plurality of PDCCHs may be transmitted within the control region. The user equipment may monitor the plurality of PDCCHs. The PDCCH is transmitted on aggregation of one or a plurality of continuous control channel elements (CCEs). The CCE is a logic allocation unit used to provide the PDCCH with a coding rate based on the status of a radio channel. The CCE corresponds to a plurality of resource element groups (REGs). The format of the PDCCH and the number of available bits of the PDCCH are determined depending on a correlation between the number of CCEs and a coding rate provided by the CCE. The base station determines a PDCCH format depending on the DCI which will be transmitted to the user equipment, and attaches cyclic redundancy check (CRC) to the control information. The CRC is masked with an identifier (for example, radio network temporary identifier (RNTI)) depending on usage of the PDCCH or owner of the PDCCH. For example, if the PDCCH is for a specific user equipment, the CRC may be masked with cell-RNTI (C-RNTI) of the corresponding user equipment. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI).

Figure 4:
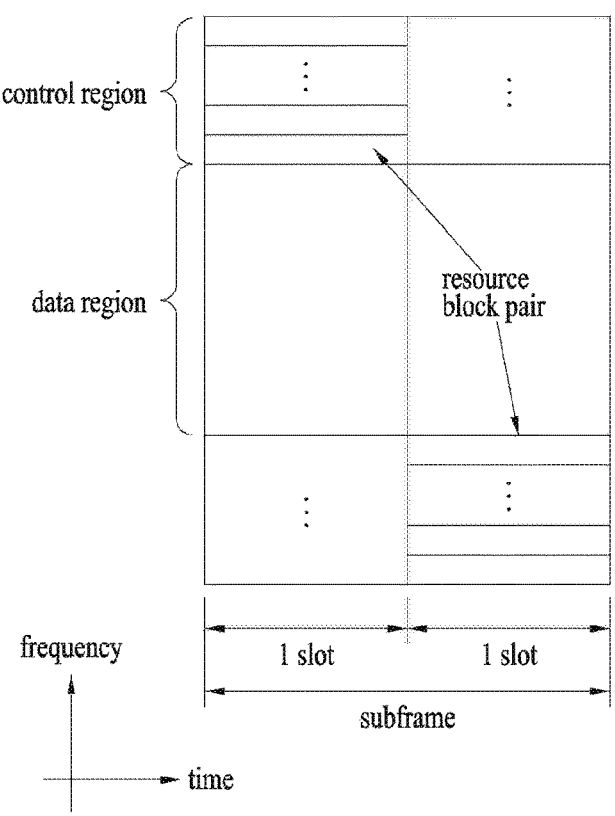
FIG. 4 is a diagram for structure of an uplink subframe.

FIG. 4 is a diagram for structure of an uplink subframe. Referring to FIG. 4, a UL subframe may be divided into a control region and a data region in a frequency domain. A physical uplink control channel (PUCCH) including uplink control information is allocated to the control region and a physical uplink shared channel (PUSCH) including user data is allocated to the data region. In order to maintain single carrier property, a UE does not transmit the PUCCH and the PUSCH at the same time. The PUCCH for one UE is allocated to a resource block pair in a subframe. The resource blocks belonging to the resource block pair occupy a different subcarrier with respect to two slots. This is represented as the resource block pair allocated to the PUCCH is frequency-hopped at a slot boundary.

MIMO System Modeling

Hereinafter, a MIMO system will be described. MIMO refers to a method using multiple transmit antennas and multiple receive antennas to improve data transmission/reception efficiency. Namely, a plurality of antennas is used at a transmitter or a receiver of a wireless communication system so that capacity can be increased and performance can be improved. MIMO may also be referred to as multi-antenna in this disclosure.

MIMO technology does not depend on a single antenna path in order to receive a whole message. Instead, MIMO technology completes data by combining data fragments received via multiple antennas. The use of MIMO technology can increase data transmission rate within a cell area of a specific size or extend system coverage at a specific data transmission rate. MIMO technology can be widely used in mobile communication terminals and relay nodes. MIMO technology can overcome a limited transmission capacity encountered with the conventional single-antenna technology in mobile communication.

FIG. 5 illustrates the configuration of a typical MIMO communication system. A transmitter has $N_T$ transmit (Tx) antennas and a receiver has $N_R$ receive (Rx) antennas. Use of a plurality of antennas at both the transmitter and the receiver increases a theoretical channel transmission capacity, compared to the use of a plurality of antennas at only one of the transmitter and the receiver. Channel transmission capacity increases in proportion to the number of antennas. Therefore, transmission rate and frequency efficiency are increased. Given a maximum transmission rate $R_o$ that may be achieved with a single antenna, the transmission rate may be increased, in theory, to the product of $R_o$ and a transmission rate increase rate $R_i$ in the case of multiple antennas, as indicated by Equation 1. $R_i$ is the smaller of $N_T$ and $N_R$.

$$R_i = \min(N_T, N_R) \quad \text{[Equation 1]}$$

For example, a MIMO communication system with four Tx antennas and four Rx antennas may theoretically achieve a transmission rate four times that of a single antenna system. Since the theoretical capacity increase of the MIMO wireless communication system was verified in the mid-1990s, many techniques have been actively developed to increase data transmission rate in real implementations. Some of these techniques have already been reflected in various wireless communication standards including standards for 3rd generation (3G) mobile communications, next-generation wireless local area networks, etc.

Active research up to now related to MIMO technology has focused upon a number of different aspects, including research into information theory related to MIMO communication capacity calculation in various channel environments and in multiple access environments, research into wireless channel measurement and model derivation of MIMO systems, and research into space-time signal processing technologies for improving transmission reliability and transmission rate.

Communication in a MIMO system will be described in detail through mathematical modeling. It is assumed that $N_T$ Tx antennas and $N_R$ Rx antennas are present as illustrated in FIG. 5. Regarding a transmission signal, up to $N_T$ pieces of information can be transmitted through the $N_T$ Tx antennas, as expressed as the following vector.

$$s = [s_1, s_2, \Lambda, s_{N_T}]^T \quad \text{[Equation 2]}$$

Individual pieces of the transmission information $s_1$, $s_2$, . . . , $s_{N_T}$ may have different transmit powers. If the individual transmit powers are denoted by $P_1, P_2, \ldots, P_{N_T}$, respectively, then the transmission power-controlled transmission information may be given as $$\hat{s} = [\hat{s}_1, \hat{s}_2, \Lambda \hat{s}_{N_T}]^T = [P_1 s_1, P_2 s_2, \Lambda P_{N_T} s_{N_T}]^T \quad \text{[Equation 3]}$$

The transmission power-controlled transmission information vector $\hat{s}$ may be expressed below, using a diagonal matrix P of transmission power.

$$\hat{s} = \begin{bmatrix} P_1 & & & 0 \\ & P_2 & & \\ & & O & \\ 0 & & & P_{N_T} \end{bmatrix} \begin{bmatrix} s_1 \\ s_2 \\ M \\ s_{N_T} \end{bmatrix} = Ps \quad \text{[Equation 4]}$$

Meanwhile, $N_T$ transmission signals $x_1, x_2, \ldots x_{N_T}$ to be actually transmitted may be configured by multiplying the transmission power-controlled information vector $\hat{s}$ by a weight matrix W. The weight matrix W functions to appropriately distribute the transmission information to individual antennas according to transmission channel states, etc. The transmission signals $x_1, x_2, \ldots, x_{N_T}$ are represented as a vector X, which may be determined by Equation 5. Here, $w_{ij}$ denotes a weight of an i-th Tx antenna and a j-th piece of information. W is referred to as a weight matrix or a precoding matrix.

$$x = \begin{bmatrix} x_1 \\ x_2 \\ M \\ x_i \\ M \\ x_{N_T} \end{bmatrix} = \begin{bmatrix} w_{11} & w_{12} & \Lambda & w_{1N_T} \\ w_{21} & w_{22} & \Lambda & w_{2N_T} \\ M & & O & M \\ w_{i1} & w_{i2} & \Lambda & w_{iN_T} \\ M & & O & M \\ w_{N_T 1} & w_{N_T 2} & \Lambda & w_{N_T N_T} \end{bmatrix} \begin{bmatrix} \hat{s}_1 \\ \hat{s}_2 \\ M \\ \hat{s}_j \\ M \\ \hat{s}_{N_T} \end{bmatrix} = W\hat{s} = WPs \quad \text{[Equation 5]}$$

Generally, the physical meaning of the rank of a channel matrix is the maximum number of different pieces of information that can be transmitted on a given channel. Therefore, the rank of a channel matrix is defined as the smaller of the number of independent rows and the number of independent columns in the channel matrix. Accordingly, the rank of the channel matrix is not larger than the number of rows or columns of the channel matrix. The rank of the channel matrix H (rank(H)) is restricted as follows.

$$\text{rank}(H) \leq \min(N_T, N_R) \quad \text{[Equation 6]}$$

A different piece of information transmitted in MIMO is referred to as a transmission stream or stream. A stream may also be called a layer. It is thus concluded that the number of transmission streams is not larger than the rank of channels, i.e. the maximum number of different pieces of transmittable information. Thus, the channel matrix H is determined by $$\text{\# of streams} \leq \text{rank}(H) \leq \min(N_T, N_R) \quad \text{[Equation 7]}$$

"# of streams" denotes the number of streams. It should be noted that one stream may be transmitted through one or more antennas.

One or more streams may be mapped to a plurality of antennas in many ways. This method may be described as follows depending on MIMO schemes. If one stream is transmitted through a plurality of antennas, this may be regarded as spatial diversity. When a plurality of streams is transmitted through a plurality of antennas, this may be spatial multiplexing. A hybrid scheme of spatial diversity and spatial multiplexing may be contemplated.

CSI Feedback

Hereinbelow, a description of channel state information (CSI) reporting will be given. In the current LTE standard, a MIMO transmission scheme is categorized into open-loop MIMO operated without CSI and closed-loop MIMO operated based on CSI. Especially, according to the closed-loop MIMO system, each of the eNB and the UE may be able to perform beamforming based on CSI in order to obtain multiplexing gain of MIMO antennas. To acquire CSI from the UE, the eNB transmits RSs to the UE and commands the UE to feed back CSI measured based on the RSs through a PUCCH or a PUSCH.

CSI is divided into three types of information: an RI, a PMI, and a CQI. First, RI is information on a channel rank as described above and indicates the number of streams that can be received via the same time-frequency resource. Since RI is determined by long-term fading of a channel, it may be generally fed back at a cycle longer than that of PMI or CQI.

Second, PMI is a value reflecting a spatial characteristic of a channel and indicates a precoding matrix index of the eNB preferred by the UE based on a metric of signal-to-interference plus noise ratio (SINR). Lastly, CQI is information indicating the strength of a channel and indicates a reception SINR obtainable when the eNB uses PMI.

An advanced system such as an LTE-A system considers additional multi-user diversity through multi-user MIMO (MU-MIMO). Due to interference between UEs multiplexed in an antenna domain in MU-MIMO, the accuracy of CSI may significantly affect interference with other multiplexed UEs as well as a UE that reports the CSI. Accordingly, more accurate CSI than in single-user MIMO (SU-MIMO) should be reported in MU-MIMO.

In this context, the LTE-A standard has determined to separately design a final PMI as a long-term and/or wideband PMI, W1, and a short-term and/or subband PMI, W2.

For example, a long-term covariance matrix of channels expressed as Equation 8 may be used for hierarchical codebook transformation that configures one final PMI with W1 and W2.

$$W = \text{norm}(W1 W2) \quad \text{[Equation 8]}$$

In Equation 8, W2 is a short-term PMI, which is a codeword of a codebook reflecting short-term channel information, W is a codeword of a final codebook, and norm(A) is a matrix obtained by normalizing each column of matrix A to 1.

Conventionally, the codewords W1 and W2 are given as Equation 9.

$$W1(i) = \begin{bmatrix} X_i & 0 \\ 0 & X_i \end{bmatrix}, \text{ where } X_i \text{ is } Nt/2 \text{ by } M \text{ matrix} \quad \text{[Equation 9]}$$

$$W2(j) = \begin{bmatrix} \overbrace{e_M^k \quad e_M^l \quad e_M^m}^{r \text{ columns}} \\ \ldots \\ \alpha_j e_M^k \quad \beta_j e_M^l \quad \gamma_j e_M^m \end{bmatrix}, \text{ if rank} = r),$$

where $1 \leq k, l, m \leq M$ and $k, l, m$ are integers where Nt is the number of Tx antennas, M is the number of columns of a matrix Xi, indicating that the matrix Xi includes a total of M candidate column vectors. eMk, eMl, and eMm denote k-th, l-th, and m-th column vectors of the matrix Xi in which only k-th, l-th, and m-th elements among M elements are 0 and the other elements are 0, respectively. $\alpha_j, \beta_j$, and $\gamma_j$ are complex values each having a unit norm and indicate that, when the k-th, l-th, and m-th column vectors of the matrix Xi are selected, phase rotation is applied to the column vectors. At this time, i is an integer greater than 0, denoting a PMI index indicating W1 and j is an integer greater than 0, denoting a PMI index indicating W2.

In Equation 9, the codewords are designed so as to reflect correlation characteristics between established channels, if cross-polarized antennas are densely arranged, for example, the distance between adjacent antennas is equal to or less than half a signal wavelength. The cross-polarized antennas may be divided into a horizontal antenna group and a vertical antenna group and the two antenna groups are co-located, each having the property of a uniform linear array (ULA) antenna.

Therefore, the correlations between antennas in each group have the same linear phase increment property and the correlation between the antenna groups is characterized by phase rotation. Since a codebook is quantized values of channels, it is necessary to design a codebook reflecting channel characteristics. For convenience of description, a rank-1 codeword designed in the above manner may be given as Equation 10.

$$W1(i) * W2(j) = \begin{bmatrix} X_i(k) \\ \alpha_j X_i(k) \end{bmatrix} \quad \text{[Equation 10]}$$

In Equation 10, a codeword is expressed as an $N_T \times 1$ vector where $N_T$ is the number of Tx antennas and the codeword is composed of an upper vector $X_i(k)$ and a lower vector $\alpha_j X_i(k)$ representing the correlation characteristics of the horizontal and vertical antenna groups, respectively. $X_i(k)$ is expressed as a vector having the linear phase increment property, reflecting the correlation characteristics between antennas in each antenna group. For example, a discrete Fourier transform (DFT) matrix may be used for $X_i(k)$.

As mentioned in the foregoing description, channel state information (CSI) includes CQI, PMI, RI, and the like in LTE system. All or a part of the CQI, the PMI, and the RI is transmitted depending on a transmission mode of a UE. When the CSI is periodically transmitted, it is referred to as periodic reporting. When the CSI is transmitted upon the request of a base station, it is referred to as aperiodic reporting. In case of the aperiodic reporting, a request bit, which is included in uplink scheduling information transmitted by a base station, is transmitted to a UE. The UE forwards CSI to the base station via a data channel (PUSCH) in consideration of a transmission mode of the UE. In case of the periodic reporting, a period and an offset in the period are signaled in a unit of a subframe according to a UE using a semi-static scheme via higher layer signaling. A UE forwards CSI to a base station via an uplink control channel (PUCCH) according to a determined period in consideration of a transmission mode. If uplink data exists at the same time in a subframe in which CSI is transmitted, the CSI is transmitted via an uplink data channel (PUSCH) together with the data. The base station transmits transmission timing information appropriate for a UE to the UE in consideration of a channel status of each UE, a UE distribution status in a cell, and the like. The transmission timing information includes a period for transmitting CSI, offset, and the like and can be transmitted to each UE via an RRC message.

LTE system includes 4 types of CQI reporting mode. Specifically, the CQI reporting mode is divided into WB CQI and SB CQI according to a CQI feedback type and is divided into no PMI and single PMI depending on whether PMI is transmitted or not. In order to periodically report CQI, each UE receives information consisting of a combination of a period and an offset via RRC signaling.

CSI reporting types defined in LTE release-10 are described in the following.

A type 1 report supports CQI feedback for a UE on a selected subband. A type 1a report supports subband CQI and second PMI feedback. A type 2, a type 2b, and a type 2c reports support wideband CQI and PMI feedback. A type 2a report supports wideband PMI feedback. A type 3 report supports RI feedback. A type 4 report supports wideband CQI. A type 5 report supports RI and wideband PMI feedback. A type 6 report supports RI and PTI (precoding type indicator) feedback.

Reference Signal (RS)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between Transmission (Tx) antennas and Reception (Rx) antennas is required for successful signal reception. Accordingly, an RS should be transmitted through each Tx antenna.

In a mobile communication system, a reference signal (RS) is mainly classified into two types according to the usage of the RS. One is an RS used for obtaining channel information and another is an RS used for demodulating data. Since the former one is used for a UE to obtain downlink channel information, it is necessary to be transmitted by a wide band. Although a UE does not receive downlink data in a specific subframe, the UE should be able to receive and measure the RS. The RS can also be used for measuring handover and the like. The latter one corresponds to an RS transmitted to a corresponding resource together with a downlink when a base station transmits the downlink A UE can perform channel estimation by receiving the RS and may be then able to demodulate data. This RS should be transmitted to a region to which data is transmitted.

In legacy 3GPP LTE system (e.g., 3GPP LTE release-8), two kinds of downlink RSs are defined for a unicast service. In particular, one is a common RS (CRS) and another is a dedicated RS (DRS). The CRS is used for obtaining information on a channel status and measuring handover and the like. The CRS may also be referred to as a cell-specific RS. The DRS is used for demodulating data and may also be referred to as a UE-specific RS. In legacy 3GPP LTE system, the DRS is used for demodulating data only and the CRS is used for two purposes, i.e., channel information acquisition and data demodulation.

The CRS is a cell-specifically transmitted RS and is transmitted in every subframe for a wide band. The CRS can be transmitted for maximum 4 antenna ports according to the number of transmission antennas of a base station. For instance, if the number of transmission antennas of a base station corresponds to 2, a CRS for a $0^{th}$ antenna port and a CRS for a $1^{st}$ antenna port are transmitted. If the number of transmission antennas of a base station corresponds to 4, CRSs for 0 to $3^{rd}$ antenna port are transmitted, respectively.

Figure 6:
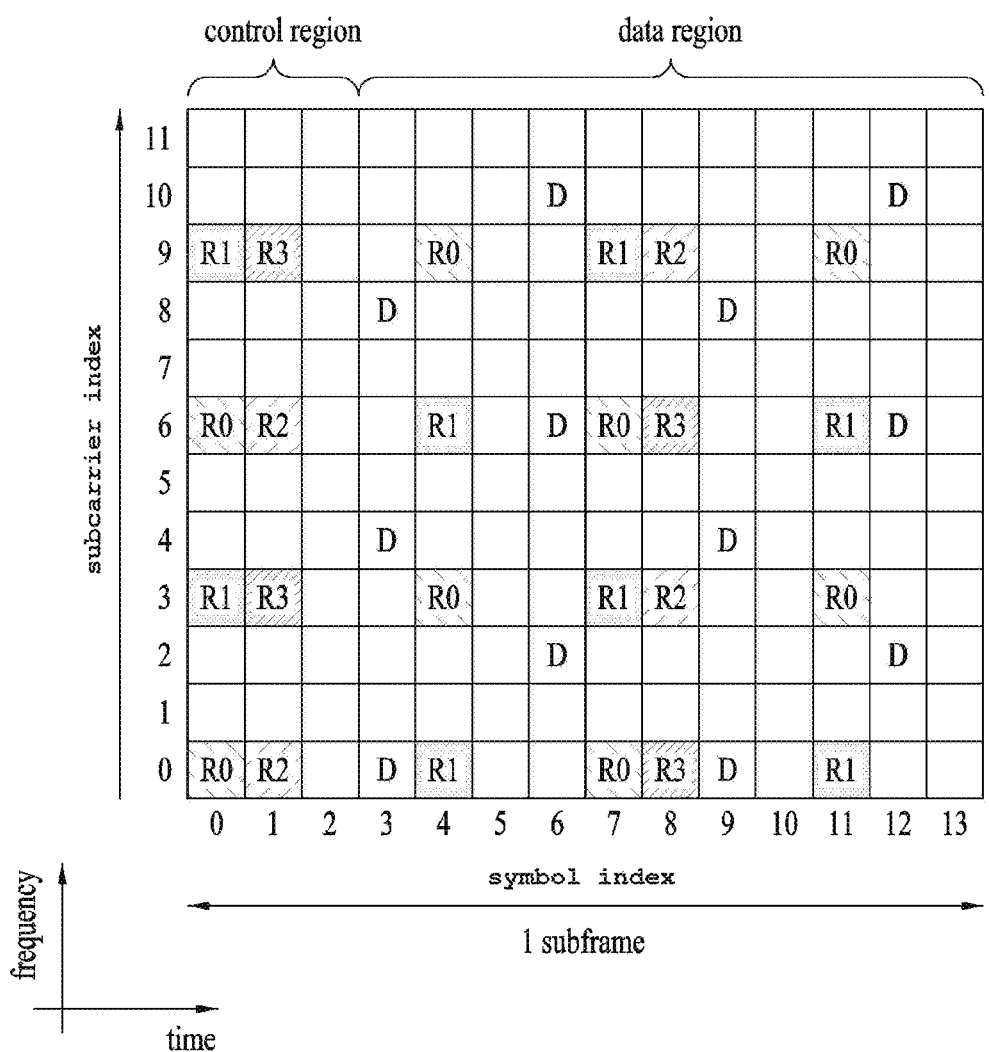
FIG. 6 is a diagram illustrating patterns of a legacy CRS and a DRS.

FIG. 6 shows a CRS pattern and a DRS pattern in a resource block (in case of a normal CP, 14 OFDM symbols in time axis and 12 subcarriers in frequency axis) of a system that a base station supports 4 transmission antennas. In FIG.

6, resource elements represented as 'R0', 'R1', 'R2' and 'R3' respectively indicate positions of CRSs for an antenna port index 0, 1, 2 and 3. Meanwhile, a resource element represented as 'D' in FIG. 6 indicates a position of a DRS defined in LTE system.

In LTE-A system corresponding to an evolved and advanced version of LTE system, it is able to support maximum 8 transmission antennas in downlink. Hence, RS for the maximum 8 transmission antennas should be supported as well. In LTE system, since a downlink RS is defined by RS for maximum 4 antenna ports only, if a base station includes the number of downlink transmission antennas greater than 4 and maximum 8 in LTE-A system, additional RS for the antenna ports should be defined. The RS for the maximum 8 transmission antenna ports should be designed to satisfy both the RS used for measuring a channel and the RS used for demodulating data.

In designing LTE-A system, one of important considerations is backward compatibility. The backward compatibility means to support a legacy LTE terminal to operate well in LTE-A system. In terms of RS transmission, if additional RS for the maximum 8 transmission antenna ports is added to time-frequency domain where a CRS defined in LTE standard is transmitted to whole band in every subframe, RS overhead becomes considerably big. Hence, in newly designing the RS for the maximum 8 antenna ports, it is necessary to consider reducing the RS overhead.

An RS newly introduced in LTE-A system can be classified into two types. One is an RS (CSI-RS (channel state information-RS)) used for measuring a channel to select MCS (modulation and coding scheme), PMI (precoding matrix index) and the like and another one is an RS (DM-RS (demodulation RS)) used for demodulating data transmitted by maximum 8 transmission antennas.

Unlike a CRS of a legacy LTE system, which is used not only for channel measurement, handover measurement and the like but also for data demodulation, the CSI-RS has a characteristic of being designed mainly for a channel measurement. Of course, the CSI-RS may also be used for measuring handover and the like. Since the CSI-RS is transmitted for the purpose of obtaining information on a channel status only, unlike the CRS of the legacy LTE system, it is not necessary to transmit the CSI-RS in every subframe. Hence, in order to reduce overhead of the CSI-RS, the CSI-RS can be designed to be intermittently (e.g., periodically) transmitted in a time axis.

If data is transmitted in a downlink subframe, a DM RS is dedicatedly transmitted to a UE to which data transmission is scheduled. A DM RS dedicated to a specific UE can be designed to be transmitted in a resource region in which the UE is scheduled, i.e., time-frequency domain to which data for the UE is transmitted only.

Figure 7:
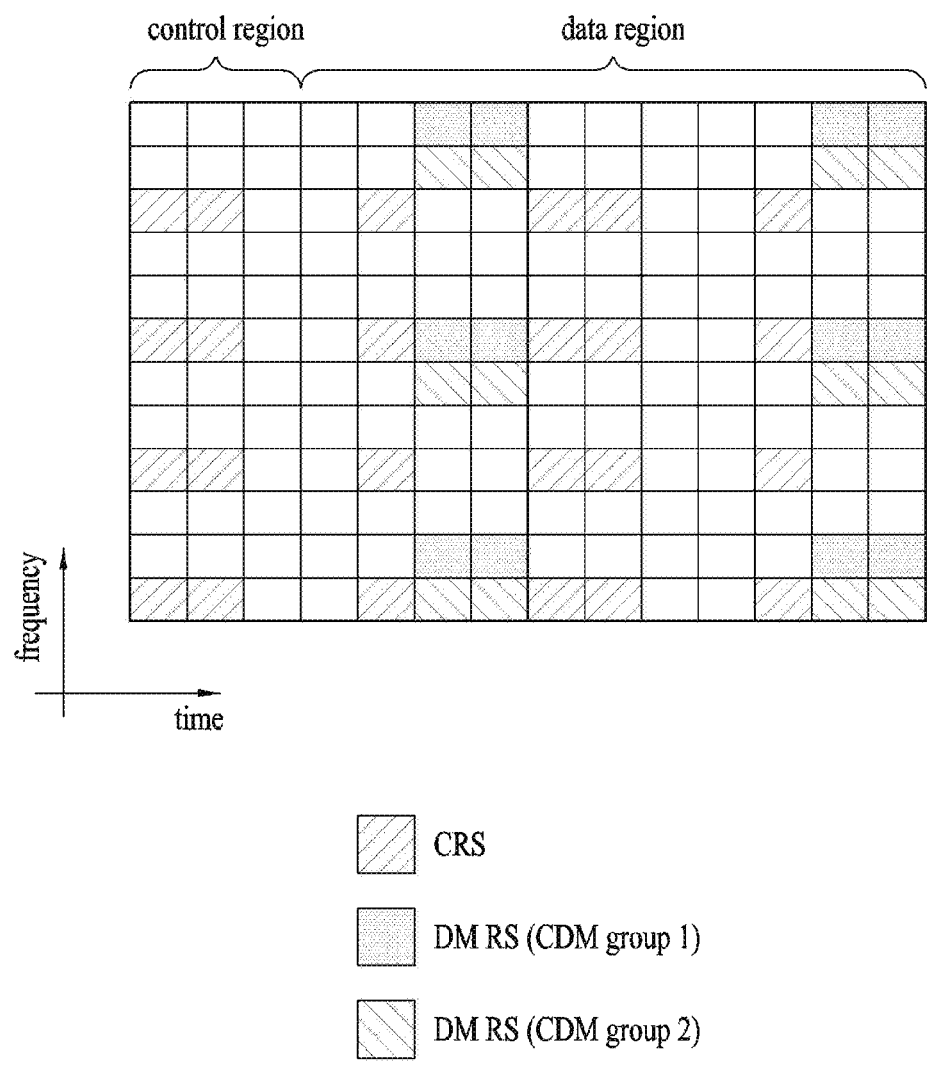
FIG. 7 is a diagram illustrating an example of a DNRS pattern.

FIG. 7 is a diagram for an example of a DM RS pattern defined in LTE-A system. In FIG. 7, in case of one RB pair (in case of a normal CP, 14 OFDM symbols in a time domain×12 subcarriers in a frequency domain) used for DL data transmission, FIG. 7 shows the locations of resource elements (REs) used for DMRS transmission. DMRS may be transmitted to 4 antenna ports (antenna port indexes 7, 8, 9 and 10) additionally defined in the LTE-A system. DMRSs for different antenna ports are located at different frequency resources (subcarriers) and/or different time resources (OFDM symbols), such that each DMRS can be identified (That is, DMRSs may be multiplexed according to the FDM and/or TDM scheme(s)). In addition, DMRSs of different antenna ports located at the same time-frequency resources may be distinguished from each other by different orthogonal codes (that is, the DMRSs may be multiplexed according to the CDM scheme). In the example of FIG. 7, DMRSs for the antenna port 7 and 8 may be located at resource elements (REs) represented as a DMRS CDM group 1 and the DMRSs can be multiplexed by an orthogonal code. Similarly, in the example of FIG. 7, DMRSs for the antenna port 9 and 10 may be located at resource elements (REs) represented as a DMRS CDM group 2 and the DMRSs can be multiplexed by an orthogonal code.

Figure 8:
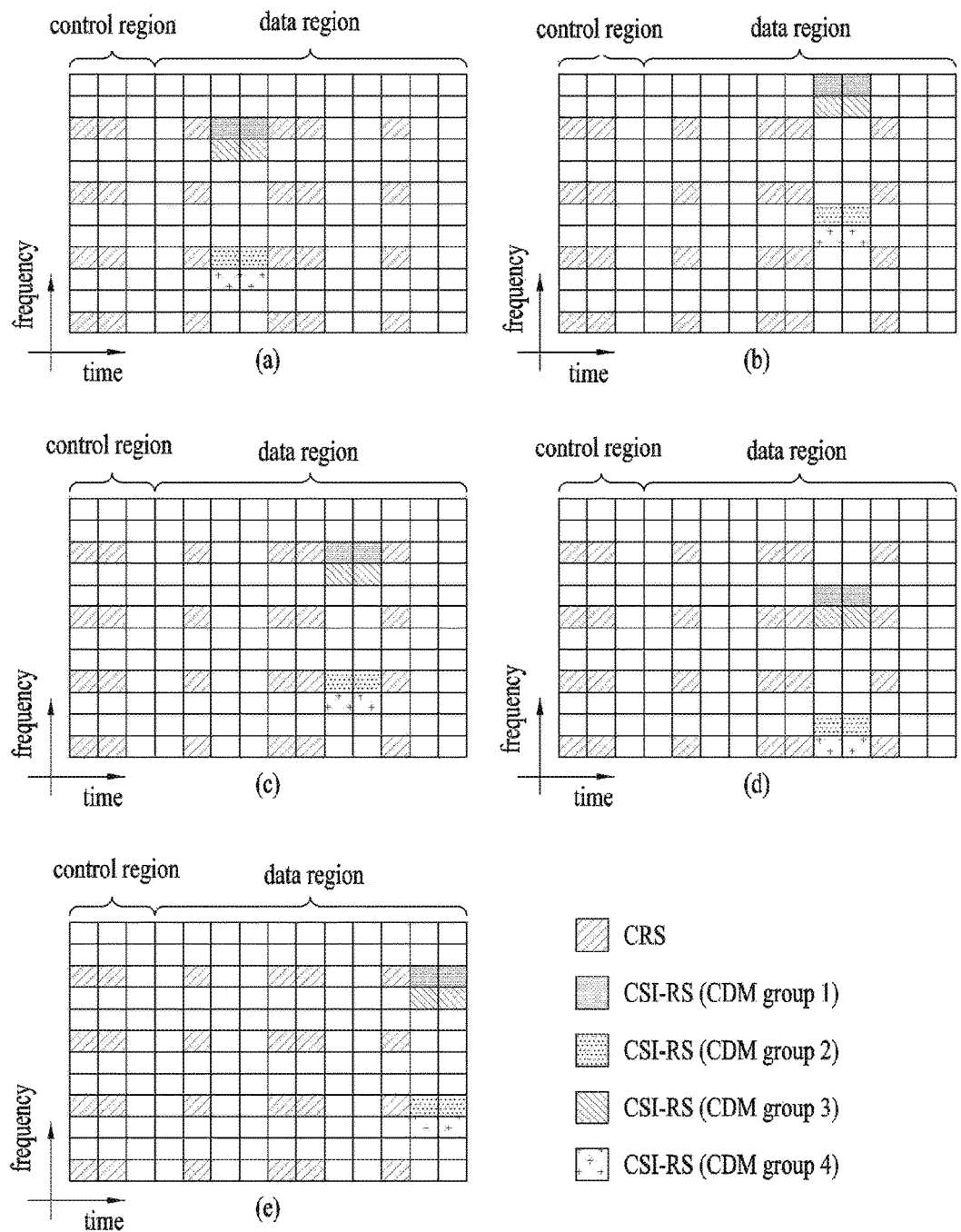
FIG. 8 is a diagram illustrating examples of a CSI-RS pattern.

FIG. 8 is a diagram for examples of a CSI-RS pattern defined in LTE-A system. In FIG. 8, in case of one RB pair (in case of a normal CP, 14 OFDM symbols in a time domain×12 subcarriers in a frequency domain) used for DL data transmission, FIG. 8 shows the locations of resource elements (REs) used for CSI-RS transmission. One CSI-RS pattern shown in FIGS. 8(a) to 8(e) may be used in a certain DL subframe. CSI-RS may be transmitted to 8 antenna ports (antenna port indexes 15, 16, 17, 18, 19, 20, 21 and 22) additionally defined in the LTE-A system. CSI-RSs for different antenna ports are located at different frequency resources (subcarriers) and/or different time resources (OFDM symbols), such that each CSI-RS can be identified (That is, CSI-RSs may be multiplexed according to the FDM and/or TDM scheme(s)). In addition, CSI-RSs of different antenna ports located at the same time-frequency resources may be distinguished from each other by different orthogonal codes (that is, the CSI-RSs may be multiplexed according to the CDM scheme). As shown in FIG. 8(a), CSI-RSs for antenna ports 15 and 16 may be located at REs represented as a CSI-RS CDM Group 1, and may be multiplexed by an orthogonal code. As shown in FIG. 8(a), CSI-RSs for antenna ports 17 and 18 may be located at REs represented as a CSI-RS CDM Group 2, and may be multiplexed by an orthogonal code. As shown in FIG. 8(a), CSI-RSs for antenna ports 19 and 20 may be located at REs represented as a CSI-RS CDM Group 3, and may be multiplexed by an orthogonal code. As shown in FIG. 8(a), CSI-RSs for antenna ports 21 and 22 may be located at REs represented as a CSI-RS CDM Group 4, and may be multiplexed by an orthogonal code. The same principles described in FIG. 8(a) may be applied to FIGS. 8(b) to 8(e).

RS patterns shown in FIGS. 6 to 8 are disclosed only for illustrative purposes, and the scope or spirit of the present invention are not limited only to a specific RS pattern. That is, even in the case in which RS patterns different from those of FIGS. 6 to 8 are defined and used, various embodiments of the present invention can also be equally applied thereto without difficulty.

CSI-RS Configuration

Among a plurality of CSI-RSs and a plurality of IMRs set to a UE, one CSI process can be defined in a manner of associating a CSI-RS resource for measuring a signal with an interference measurement resource (IMR) for measuring interference. A UE feedbacks CSI information induced from CSI processes different from each other to a network (e.g., base station) with an independent period and a subframe offset.

In particular, each CSI process has an independent CSI feedback configuration. The base station can inform the UE of the CS-RS resource, the IMR resource association information and the CSI feedback configuration via higher layer signaling. For example, assume that three CSI processes shown in Table 1 are set to the UE.

TABLE 1

| CSI Process | Signal Measurement Resource (SMR) | IMR |
|---|---|---|
| CSI process 0 | CSI-RS 0 | IMR 0 |
| CSI process 1 | CSI-RS 1 | IMR 1 |
| CSI process 2 | CSI-RS 0 | IMR 2 |

In Table 1, a CSI-RS 0 and a CSI-RS 1 indicate a CSI-RS received from a cell 1 corresponding to a serving cell of a UE and a CSI-RS received from a cell 2 corresponding to a neighbor cell participating in cooperation, respectively. IMRs set to each of the CSI processes shown in Table 1 are shown in Table 2.

TABLE 2

| IMR | eNB 1 | eNB 2 |
|---|---|---|
| IMR 0 | Muting | Data transmission |
| IMR 1 | Data transmission | Muting |
| IMR 2 | Muting | Muting |

A cell 1 performs muting in an IMR 0 and a cell 2 performs data transmission in the IMR 0. A UE is configured to measure interference from other cells except the cell 1 in the IMR 0. Similarly, the cell 2 performs muting in an IMR 1 and the cell 1 performs data transmission in the IMR 1. The UE is configured to measure interference from other cells except the cell 2 in the IMR 1. The cell 1 and the cell 2 perform muting in an IMR 2 and the UE is configured to measure interference from other cells except the cell 1 and the cell 2 in the IMR 2.

Hence, as shown in Table 1 and Table 2, if data is received from the cell 1, CSI information of the CSI process 0 indicates optimized RI, PMI and CQI information. If data is received from the cell 2, CSI information of the CSI process 1 indicates optimized RI, PMI and CQI information. If data is received from the cell 1 and there is no interference from the cell 2, CSI information of the CSI process 2 indicates optimized RI, PMI and CQI information.

It is preferable for a plurality of CSI processes set to a UE to share values subordinate to each other. For example, in case of joint transmission performed by the cell 1 and the cell 2, if a CSI process 1 considering a channel of the cell 1 as a signal part and a CSI process 2 considering a channel of the cell 2 as a signal part are set to a UE, it is able to easily perform JT scheduling only when ranks of the CSI process 1 and the CSI process 2 and a selected subband index are identical to each other.

A period or a pattern of transmitting a CSI-RS can be configured by a base station. In order to measure the CSI-RS, a UE should be aware of CSI-RS configuration of each CSI-RS antenna port of a cell to which the UE belongs thereto. The CSI-RS configuration can include a DL subframe index in which the CSI-RS is transmitted, time-frequency location of a CSI-RS resource element (RE) in a transmission subframe (e.g., the CSI-RS patterns shown in FIGS. 8(*a*) to 8(*e*)) and a CSI-RS sequence (a sequence used for a CSI-RS usage, the sequence is pseudo-randomly generated according to a prescribed rule based on a slot number, a cell ID, a CP length and the like), etc. In particular, a plurality of CSI-RS configurations can be used by a random (given) base station and the base station can inform a UE(s) in a cell of a CSI-RS configuration to be used for the UE(s).

Since it is necessary to identify a CSI-RS for each antenna port, resources to which the CSI-RS for each antenna port is transmitted should be orthogonal to each other. As mentioned earlier with reference to FIG. 8, the CSI-RS for each antenna port can be multiplexed by the FDM, the TDM and/or the CDM scheme using an orthogonal frequency resource, an orthogonal time resource and/or an orthogonal code resource.

When the base station informs the UEs belonging to a cell of information on a CSI-RS (CSI-RS configuration), it is necessary for the base station to preferentially inform the UEs of information on time-frequency to which the CSI-RS for each antenna port is mapped. Specifically, information on time can include numbers of subframes in which a CSI-RS is transmitted, a period of transmitting a CSI-RS, a subframe offset of transmitting a CSI-RS, an OFDM symbol number in which a CSI-RS resource element (RE) of a specific antenna is transmitted, etc. Information on frequency can include a frequency space of transmitting a CSI-RS resource element (RE) of a specific antenna, an RE offset on a frequency axis, a shift value, etc.

Figure 9:
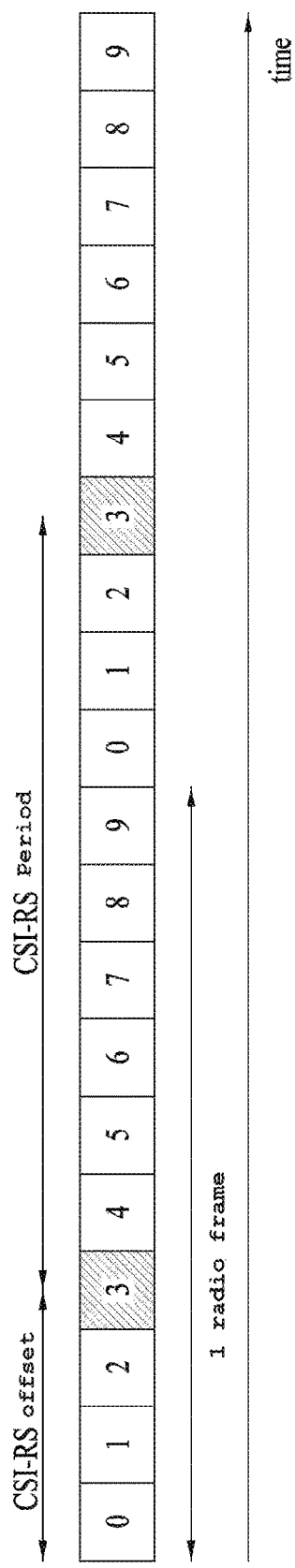
FIG. 9 is a diagram for explaining an example of a scheme of periodically transmitting a CSI-RS.

FIG. 9 is a diagram for explaining an example of a scheme of periodically transmitting a CSI-RS. A CSI-RS can be periodically transmitted with a period of an integer multiple of a subframe (e.g., 5-subframe period, 10-subframe period, 20-subframe period, 40-subframe period or 80-subframe period).

FIG. 9 shows a radio frame configured by 10 subframes (subframe number 0 to 9). In FIG. 9, for example, a transmission period of a CSI-RS of a base station corresponds to 10 ms (i.e., 10 subframes) and a CSI-RS transmission offset corresponds to 3. The offset value may vary depending on a base station to make CSI-RSs of many cells to be evenly distributed in time domain. If a CSI-RS is transmitted with a period of 10 ms, an offset value may have one selected from among 0 to 9 Similarly, if a CSI-RS is transmitted with a period of 5 ms, an offset value may have one selected from among 0 to 4. If a CSI-RS is transmitted with a period of 20 ms, an offset value may have one selected from among 0 to 19. If a CSI-RS is transmitted with a period of 40 ms, an offset value may have one selected from among 0 to 39. If a CSI-RS is transmitted with a period of 80 ms, an offset value may have one selected from among 0 to 79. The offset value corresponds to a value of a subframe in which CSI-RS transmission starts by a base station transmitting a CSI-RS with a prescribed period. If the base station informs a UE of a transmission period of a CSI-RS and an offset value, the UE is able to receive the CSI-RS of the base station at a corresponding subframe position using the transmission period and the offset value. The UE measures a channel through the received CSI-RS and may be then able to report such information as a CQI, a PMI and/or an RI (rank indicator) to the base station. In the present disclosure, the CQI, the PMI and/or the RI can be commonly referred to as CQI (or CSI) except a case of individually explaining the CQI, the PMI and/or the RI. And, the CSI-RS transmission period and the offset can be separately designated according to a CSI-RS configuration.

Figure 10:
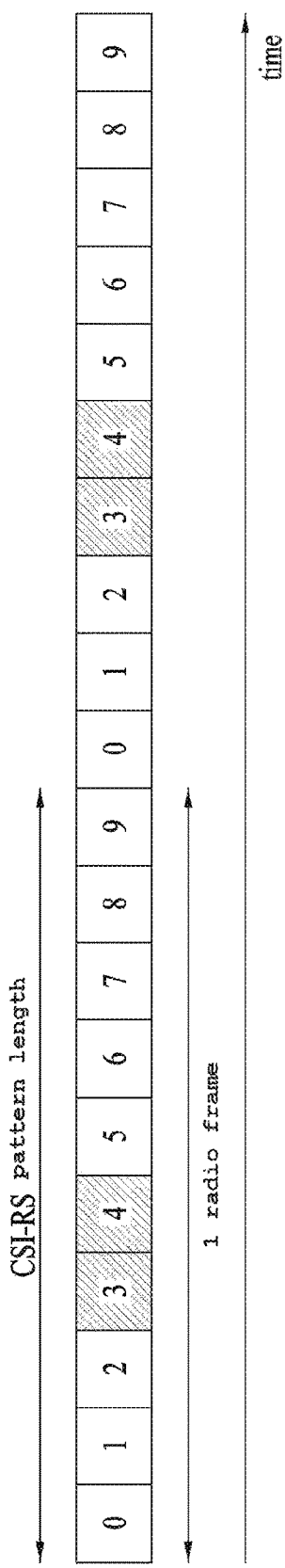
FIG. 10 is a diagram for explaining an example of a scheme of aperiodically transmitting a CSI-RS.

FIG. 10 is a diagram for explaining an example of a scheme of aperiodically transmitting a CSI-RS. In FIG. 10, for example, one radio frame is configured by 10 subframes (subframe number 0 to 9). As shown in FIG. 10, a subframe in which a CSI-RS is transmitted can be represented as a specific pattern. For example, a CSI-RS transmission pattern can be configured by a 10-subframe unit and whether to transmit a CSI-RS can be indicated by a 1-bit indicator in each subframe. An example of FIG. 10 shows a pattern of transmitting a CSI-RS in a subframe index 3 and 4 among 10 subframes (subframe index 0 to 9). The indicator can be provided to a UE via higher layer signaling.

As mentioned in the foregoing description, configuration of CSI-RS transmission can be variously configured. In order to make a UE properly receive a CSI-RS and perform channel measurement, it is necessary for a base station to inform the UE of CSI-RS configuration. Embodiments of the present invention for informing a UE of CSI-RS configuration are explained in the following.

Method of Indicating CSI-RS Configuration

In general, a base station is able to inform a UE of CSI-RS configuration by one of two schemes in the following.

A first scheme is a scheme that a base station broadcasts information on CSI-RS configuration to UEs using dynamic broadcast channel (DBCH) signaling.

In a legacy LTE system, when contents on system information are informed to UEs, the information is transmitted to the UEs via a BCH (broadcasting channel). Yet, if the contents are too much and the BCH is unable to carry all of the contents, the base station transmits the system information using a scheme used for transmitting a general downlink data. And, PDCCH CRC of corresponding data is transmitted in a manner of being masked using SI-RNTI, i.e., system information RNTI, instead of a specific UE ID (e.g., C-RNTI). In this case, actual system information is transmitted to a PDSCH region together with a general unicast data. By doing so, all UEs in a cell decode PDCCH using the SI-RNTI, decode PDSCH indicated by the corresponding PDCCH and may be then able to obtain the system information. This sort of broadcasting scheme may be referred to as a DBCH (dynamic BCH) to differentiate it from a general broadcasting scheme, i.e., PBCH (physical BCH).

Meanwhile, system information broadcasted in a legacy LTE system can be divided into two types. One is a master information block (MIB) transmitted on the PBCH and another one is a system information block (SIB) transmitted on a PDSCH region in a manner of being multiplexed with a general unicast data. In the legacy LTE system, since informations transmitted with an SIB type 1 to an SIB type 8 (SIB1 to SIB8) are already defined, it may be able to define a new SIB type to transmit information on a CSI-RS configuration corresponding to new system information not defined in the legacy SIB types. For example, it may be able to define SIB9 or SIB10 and the base station can inform UEs within a cell of the information on the CSI-RS configuration via the SIB9 or the SIB10 using a DBCH scheme.

A second scheme is a scheme that a base station informs each UE of information on CSI-RS configuration using RRC (radio resource control) signaling. In particular, the information on the CSI-RS can be provided to each of the UEs within a cell using dedicated RRC signaling. For example, in the course of establishing a connection with the base station via an initial access or handover of a UE, the base station can inform the UE of the CSI-RS configuration via RRC signaling. Or, when the base station transmits an RRC signaling message, which requires channel status feedback based on CSI-RS measurement, to the UE, the base station can inform the UE of the CSI-RS configuration via the RRC signaling message.

Indication of CSI-RS Configuration

A random base station may use a plurality of CSI-RS configurations and the base station can transmit a CSI-RS according to each of a plurality of the CSI-RS configurations to a UE in a predetermined subframe. In this case, the base station informs the UE of a plurality of the CSI-RS configurations and may be able to inform the UE of a CSI-RS to be used for measuring a channel state for making a feedback on a CQI (channel quality information) or CSI (channel state information).

Embodiments for a base station to indicate a CSI-RS configuration to be used in a UE and a CSI-RS to be used for measuring a channel are explained in the following.

Figure 11:
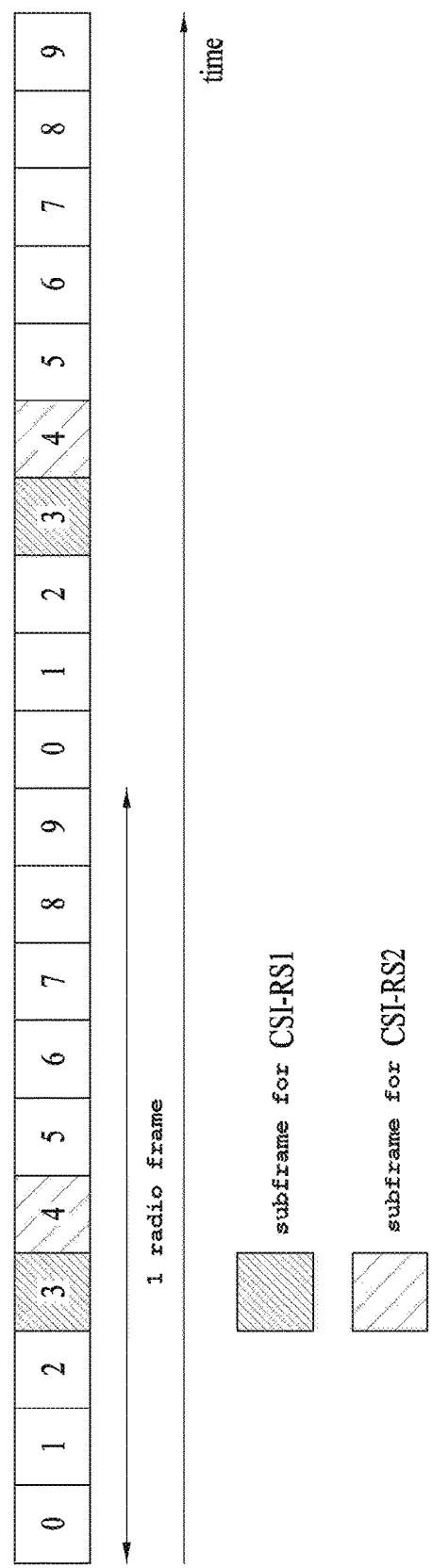
FIG. 11 is a diagram for explaining an example of using two CSI-RS configurations.

FIG. 11 is a diagram for explaining an example of using two CSI-RS configurations. In FIG. 11, for example, one radio frame is configured by 10 subframes (subframe number 0 to 9). In FIG. 11, in case of a first CSI-RS configuration, i.e., a CSI-RS1, a transmission period of a CSI-RS is 10 ms and a transmission offset of a CSI-RS is 3. In FIG. 11, in case of a second CSI-RS configuration, i.e., a CSI-RS2, a transmission period of a CSI-RS is 10 ms and a transmission offset of a CSI-RS is 4. A base station informs a UE of information on two CSI-RS configurations and may be able to inform the UE of a CSI-RS configuration to be used for CQI (or CSI) feedback among the two CSI-RS configurations.

If the base station asks the UE to make a CQI feedback on a specific CSI-RS configuration, the UE can perform channel state measurement using a CSI-RS belonging to the CSI-RS configuration only. Specifically, a channel state is determined based on CSI-RS reception quality, an amount of noise/interference and a function of a correlation coefficient. In this case, the CSI-RS reception quality is measured using the CSI-RS belonging to the CSI-RS configuration only. In order to measure the amount of noise/interference and the correlation coefficient (e.g., an interference covariance matrix indicating interference direction, etc.), measurement can be performed in a subframe in which the CSI-RS is transmitted or a subframe designated in advance. For example, in the embodiment of FIG. 11, if the base station asks the UE to make a feedback on the first CSI-RS configuration (CSI-RS1), the UE measures reception quality using a CSI-RS transmitted in a fourth subframe (a subframe index 3) of a radio frame and the UE can be separately designated to use an add number subframe to measure the amount of noise/interference and the correlation coefficient. Or, it is able to designate the UE to measure the CSI-RS reception quality, the amount of noise/interference and the correlation coefficient in a specific single subframe (e.g., a subframe index 3) only.

For example, reception signal quality measured using a CSI-RS can be simply represented by SINR (signal-to-interference plus noise ratio) as S/(I+N) (in this case, S corresponds to strength of a reception signal, I corresponds to an amount of interference and N corresponds to an amount of noise). The S can be measured through a CSI-RS in a subframe including the CSI-RS in a subframe including a signal transmitted to a UE. Since the I and the N change according to an amount of interference received from a neighbor cell, direction of a signal received from a neighbor cell, and the like, the I and the N can be measured by an SRS transmitted in a subframe in which the S is measured or a separately designated subframe, etc.

In this case, the amount of noise/interference and the correlation coefficient can be measured in a resource element (RE) in which a CRS belonging to a corresponding subframe or a CSI-RS is transmitted. Or, in order to easily measure noise/interference, the noise/interference can be measured through a configured null RE. In order to measure noise/interference in a CRS or CSI-RS RE, a UE preferentially recovers a CRS or a CSI-RS and subtracts a result of the recovery from a reception signal to make a noise and interference signal to be remained only. By doing so, the UE is able to obtain statistics of noise/interference from the remained noise and the interference signal. A null RE may correspond to an empty RE (i.e., transmission power is 0 (zero)) in which no signal is transmitted by a base station. The null RE makes other base stations except the corresponding base station easily measure a signal. In order to measure an amount of noise/interference, it may use all of a CRS RE, a CSI-RS RE and a null RE. Or, a base station may designate REs to be used for measuring noise/interference for a UE. This is because it is necessary to properly designate an RE to be used for measuring noise/interference measured by the UE according to whether a signal of a neighbor cell transmitted to the RE corresponds to a data signal or a control signal. Since the signal of the neighbor cell transmitted to the RE varies according to whether or not synchronization between cells is matched, a CRS configuration, a CSI-RS configuration and the like, the base station identifies the signal of the neighbor cell and may be able to designate an RE in which measurement is to be performed for the UE. In particular, the base station can designate the UE to measure noise/interference using all or a part of the CRS RE, the CSI-RS RE and the null RE.

For example, the base station may use a plurality of CSI-RS configurations and may be able to inform the UE of a CSI-RS configuration to be used for CQI feedback and a null RE position while informing the UE of one or more CSI-RS configurations. In order to distinguish the CSI-RS configuration to be used for CQI feedback by the UE from a null RE transmitted by zero transmission power, the CSI-RS configuration to be used for CQI feedback by the UE may correspond to a CSI-RS configuration transmitted by non-zero transmission power. For example, if the base station informs the UE of a CSI-RS configuration in which the UE performs channel measurement, the UE can assume that a CSI-RS is transmitted by non-zero transmission power in the CSI-RS configuration. In addition, if the base station informs the UE of a CSI-RS configuration transmitted by zero transmission power (i.e., null RE position), the UE can assume that an RE position of the CSI-RS configuration corresponds to zero transmission power. In other word, when the base station informs the UE of a CSI-RS configuration of non-zero transmission power, if there exists a CSI-RS configuration of zero transmission power, the base station can inform the UE of a corresponding null RE position.

As a modified example of the method of indicating a CSI-RS configuration, the base station informs the UE of a plurality of CSI-RS configurations and may be able to inform the UE of all or a part of CSI-RS configurations to be used for CQI feedback among a plurality of the CSI-RS configurations. Hence, having received a request for CQI feedback on a plurality of the CSI-RS configurations, the UE measures a CQI using a CSI-RS corresponding to each CSI-RS configuration and may be then able to transmit a plurality of CQI information to the base station.

Or, in order to make the UE transmit a CQI for each of a plurality of the CSI-RS configurations, the base station can designate an uplink resource, which is necessary for the UE to transmit the CQI, in advance according to each CSI-RS configuration. Information on the uplink resource designation can be provided to the UE in advance via RRC signaling.

Or, the base station can dynamically trigger the UE to transmit a CQI for each of a plurality of CSI-RS configurations to the base station. Dynamic triggering of CQI transmission can be performed via PDCCH. It may inform the UE of a CSI-RS configuration for which a CQI is to be measured via PDCCH. Having received the PDCCH, the UE can feedback a CQI measurement result measured for the CSI-RS configuration designated by the PDCCH to the base station.

A transmission timing of a CSI-RS corresponding to each of a plurality of the CSI-RS configurations can be designated to be transmitted in a different subframe or an identical subframe. If CSI-RSs according to CSI-RS configurations different from each other are designated to be transmitted in an identical subframe, it may be necessary to distinguish the CSI-RSs from each other. In order to distinguish the CSI-RSs according to the CSI-RS configurations different from each other, it may be able to differently apply at least one selected from the group consisting of a time resource, a frequency resource and a code resource of CSI-RS transmission. For example, an RE position in which a CSI-RS is transmitted can be differently designated in a subframe according to a CSI-RS configuration (e.g., a CSI-RS according to one CSI-RS configuration is designated to be transmitted in an RE position shown in FIG. 8 (*a*) and a CSI-RS according to another CSI-RS configuration is designated to be transmitted in an RE position shown in FIG. 8 (*b*)) (distinction using a time and frequency resource). Or, if CSI-RSs according to CSI-RS configurations different from each other are transmitted in an identical RE position, the CSI-RSs can be distinguished from each other by differently using a CSI-RS scrambling code in the CSI-RS configurations different from each other (distinction using a code resource).

Quasi Co-Located (QC)

A UE can receive data from a plurality of transmission points (TPs) (e.g., a TP1 and a TP2). Hence, the UE is able to transmit channel state information on a plurality of the TPs. In this case, RSs can also be transmitted to the UE from a plurality of the TPs. In this case, if it is able to share properties for channel estimation from RS ports different from each other of TPs different from each other, it may be able to reduce load and complexity of reception processing of the UE. Moreover, if it is able to share properties for channel estimation from RS ports different from each other of an identical TP between the RS ports, it may be able to reduce load and complexity of reception processing of the UE. Hence, LTE-A system proposes a method of sharing properties for channel estimation between RS ports.

For channel estimation between RS ports, LTE-A system has introduced such a concept as "quasi co-located (QLC)". For example, if two antenna ports are quasi co-located (QC), the UE may assume that large-scale properties of the signal received from the first antenna port can be inferred from the signal received from the other antenna port". In this case, the large-scale properties can include at least one selected from the group consisting of delay spread, Doppler spread, Doppler shift, average gain and average delay. In the following, the quasi co-located is simply referred to as QCL.

In particular, if two antenna ports are QCL, it may indicate that large-scale properties of a radio channel received from one antenna port are identical to large-scale properties of a radio channel received from another antenna port. If antenna ports transmitting RSs different from each other are QCL, large-scale properties of a radio channel received from one antenna port of a type can be replaced with large-scale properties of a radio channel received from one antenna port of a different type.

According to the aforementioned QCL concept, a UE is unable to assume large-scale channel properties identical to each other between radio channels received from non-QCL (NQC) antenna ports. In particular, in this case, a UE should perform an independent processing according to each configured non-QCL antenna port to obtain timing acquisition and tracking, frequency offset estimation and compensation, delay estimation, and Doppler estimation and the like.

A UE can perform operations in the following between antenna ports capable of assuming QCL. First of all, the UE can use delay spread, Doppler spectrum, Doppler spread estimation result for a radio channel received from an antenna port when a channel is estimated for a radio channel received from a different antenna port. Secondly, regarding frequency shift and received timing, after time synchronization and frequency synchronization for a single antenna port are performed, the UE can apply identical synchronization to demodulation of a different antenna port. Thirdly, regarding average received power, the UE can average RSRP (reference signal received power) measurements for over two or more antenna ports.

If a UE receives a DMRS-based DL-related DCI format via a control channel (PDCCH or EPDCCH), the UE performs channel estimation for a corresponding PDSCH via a DM-RS sequence and performs data demodulation. If DMRS port configuration received from a DL scheduling grant is capable of being QCL with a CRS port, the UE can apply the large-scale channel properties estimation estimated from the CRS port as it is in case of estimating a channel via the DMRS port. This is because a CRS corresponds to a reference signal broadcasted in every subframe with relatively high density over a whole band, the estimation on the large-scale channel properties can be more stably obtained from the CRS. On the contrary, since a DMRS is UE-specifically transmitted for a specific scheduled RB and a precoding matrix, which is used by a base station for transmission, may vary according to a PRG unit, an effective channel received by the UE may vary according to the PRG unit. Hence, if a DMRS is used for estimating the large-scale channel properties of a radio channel over a wide band, performance degradation may occur. In case of a CSI-RS, since the CSI-RS has a relatively long transmission period and a relatively low density, if the CSI-RS is used for estimating the large-scale channel properties of the radio channel, performance degradation may occur.

In particular, QCL assumption between antenna ports can be utilized for receiving various DL reference signals, estimating a channel, reporting a channel state and the like.

Massive MIMO

A recent wireless communication system considers introducing an active antenna system (hereinafter, AAS). Unlike a legacy passive antenna system that an amplifier capable of adjusting a phase and a size of a signal is separated from an antenna, the AAS corresponds to a system that each antenna is configured as an active antenna including such an active circuit as an amplifier. Since the AAS uses an active antenna, it is not necessary for the AAS to have a separate cable for connecting an amplifier with an antenna, a connector, other hardware, and the like. Hence, the AAS has characteristics that efficiency is high in terms of energy and management cost. In particular, since the AAS supports an electronic beam control scheme according to each antenna, the AAS enables an evolved MIMO technique such as forming a delicate beam pattern in consideration of a beam direction and a beam width, forming a 3D beam pattern, and the like.

As the evolved antenna system such as the AAS and the like is introduced, a massive MIMO structure including a plurality of input/output antennas and multi-dimensional antenna structure are also considered. As an example, in case of forming a 2D antenna array instead of a legacy straight antenna array, it may be able to form a 3D beam pattern by the active antenna of the AAS.

Figure 12:
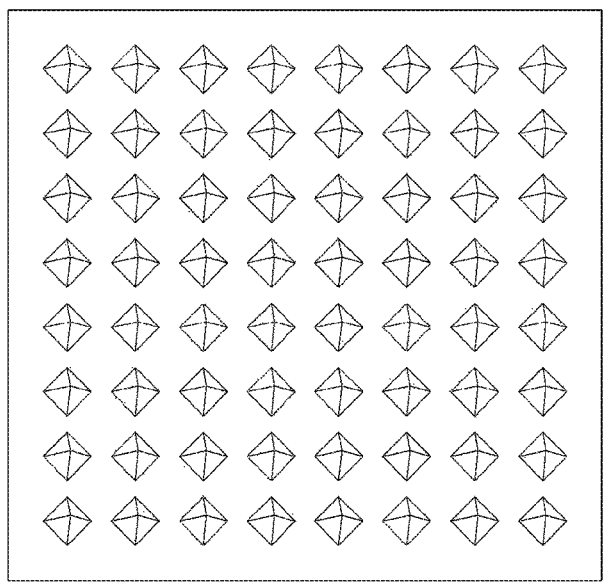
FIG. 12 illustrates a 2D active antenna system having 64 antenna elements.

FIG. 12 illustrates a 2D active antenna system having 64 antenna elements.

Referring to FIG. 12, it is able to see that $N_t = N_v \cdot N_h$ number of antennas forms a shape of square. In particular, $N_h$ and $N_v$ indicate the number of antenna columns in horizontal direction and the number of antenna rows in vertical direction, respectively.

If the 3D beam pattern is utilized in the aspect of a transmission antenna, it may be able to perform semi-static or dynamic beam forming not only in horizontal direction but also in vertical direction of a beam. As an example, it may consider such an application as sector forming in vertical direction and the like. In the aspect of a reception antenna, when a reception beam is formed using massive antennas, it may be able to expect a signal power increasing effect according to an antenna array gain. Hence, in case of uplink, an eNB is able to receive a signal transmitted from a UE through a plurality of antennas. In this case, in order to reduce interference impact, the UE can configure transmit power of the UE to be very low in consideration of a gain of massive reception antennas.

Figure 13:
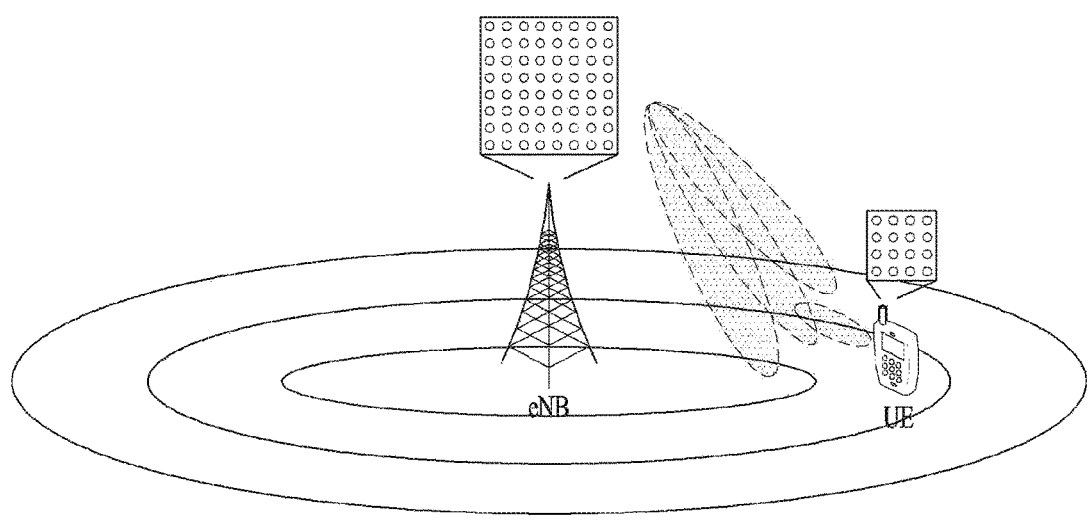
FIG. 13 illustrates a 3D-MIMO system utilizing 2D-AAS.

FIG. 13 illustrates a 3D-MIMO system utilizing 2D-AAS. In particular, FIG. 13 shows a system that an eNB or a UE has a plurality of transmission/reception antennas capable of forming an AAS-based 3D beam.

A current communication system distinguishes a CSI reporting type into a class A and a class B to calculate and feedback CSI. The class A and the class B are described in the following, respectively.

Class A CSI Reporting

In massive MIMO or FD MIMO system, an eNB can set a plurality of CSI-RS resources to a UE in a single CSI process. In this case, the UE does not consider each of CSI-RS resources set within a single CSI process as an independent channel. The UE assumes a huge CSI-RS resource by aggregating the CSI-RS resources and calculates and feedbacks CSI based on the huge CSI-RS resource. For example, if the base station sets three 4-port CSI-RS resources belonging to a signal CSI process to the UE, the UE assumes one 12-port CSI-RS resource by aggregating the three 4-port CSI-RS resources. The UE calculates and feedbacks CSI using 12-port PMI based on the resource.

Class B CSI Reporting

In massive MIMO or FD MIMO system, an eNB can configure a plurality of CSI-RS resources to a UE in a single CSI process. For example, the eNB can configure eight 4-port CSI-RS resources in a CSI process For example, vertical beamforming is applied to each of the CSI-RS resources.

The UE may assume each of the CSI-RS resources as an independent channel and selects one from among the CSI-RS resources. The UE calculates and reports CSI on the basis of the selected resource. In particular, the UE selects a CSI-RS of a strong channel from among the 8 CSI-RS resources, calculates CSI on the basis of the selected CSI-RS, and reports the CSI to the base station. In this case, the UE additionally reports the selected CSI-RS to the base station via a CRI value.

In order to effectively show the aforementioned characteristic, it may be able to define K corresponding to the number of CSI-RS resources existing in a CSI process. $N_k$ corresponds to the number of CSI-RS ports of a $k^{th}$ CSI-RS resource.

Legacy RI Inheritance Scheme

As mentioned in the foregoing description, an eNB can configure a plurality of CSI processes to a UE. For example, the eNB can configure two CSI processes (CSI process 0 and CSI process 1) to the UE and configure the CSI process 0 and the CSI process 1 as a reference CSI process and a dependent CSI process, respectively. The UE calculates an RI of the reference CSI process on the basis of a CSI-RS and IMR of the reference CSI process. On the contrary, the UE reports an RI value identical to an RI value of a most recently reported reference CSI process in the dependent CSI process. The abovementioned process is defined as an RI of the reference CSI process is inherited to the dependent CSI process.

Based on the aforementioned discussion, inheritance between CSI processes for massive MIMO or FD MIMO is explained in the present invention.

According to a legacy reference CSI process and a dependent CSI process, a single CSI-RS resource is set to each CSI process. Yet, according to the class B, a plurality of CSI-RS resources can be set to a single CSI process and a different CBSR (codebook subset restriction) can be configured according to a CSI-RS resource. Hence, a restriction between the legacy reference CSI process and the dependent CSI process can be extended and changed in the class B.

As a simplest example, a class B process can be configured to satisfy a legacy restriction for both a random CSI-RS resource of the reference CSI process and a random CSI-RS resource of the dependent CSI process while the legacy restriction is maintained as it is.

In particular, the number of ports of a CSI-RS (selected as a CRI) of the reference CSI process is identical to the number of ports of a CSI-RS (selected as a CRI) of the dependent CSI process according to a CRI (CSI-RS indicator) irrespective of a selected CSI-RS. And, a set of RIs capable of being selected by a UE on the basis of the CSI-RS (selected as a CRI) of the reference CSI process is identical to a set of RIs capable of being selected by the UE on the basis of the CSI-RS (selected as a CRI) of the dependent CSI process.

The restrictions between the reference CSI process and the dependent CSI process in the class B are described in the following. The restrictions can be applied at a time or a part of the restrictions can be applied only.

First of all, restriction on the number of CSI-RS antenna ports is explained in the following.

It may set a limit on all CSI-RS resources configured in a reference CSI process and a dependent CSI process to make the resources have the same number of antenna ports.

Or, it may restrict a maximum Nk configured to the reference CSI process (i.e., the number of ports of a resource having the maximum number of antenna ports among CSI-RS resources of the reference CSI process) to be always identical to a maximum Nk configured to the dependent CSI process. In this case, when an RI is reported without a CRI, the reference CSI process may exist at either PTI or W1.

Or, it may restrict the number of antenna ports of a random CSI-RS configured in the reference CSI process to be equal to or less than the number of antenna ports of a random CSI-RS resource configured in the dependent CSI process.

Or, it may restrict the number of antenna ports of a random CSI-RS configured in the reference CSI process to be equal to or greater than the number of antenna ports of a random CSI-RS resource configured in the dependent CSI process.

If a CSI process among a plurality of CSI processes is configured as a reference CSI process and subframe sets $C_{CSI,0}$ and $C_{CSI,1}$ for performing resource-restrictive measurement are set to a single CSI process only among a plurality of the CSI processes, a UE does not expect that a subframe subset to which a different RI set is applied is to be configured between the subframe sets for each of CSI-RS resources defined in the CSI process to which the subframe sets are set. In particular, a subframe subset to which the same RI set is applied is always configured between the subframe sets.

If the subframe sets $C_{CSI,0}$ and $C_{CSI,1}$ for performing resource-restrictive measurement are not set to neither a reference CSI process nor a dependent CSI process, all CSI-RS resources configured in the reference CSI process and the dependent CSI process have the same RI sets via CBSR. For example, if a 2-port CSI-RS resources 0 and a 4-port CSI-RS resource 1 are set to the reference CSI process and a 4-port CSI-RS resource 2 and an 8-port CSI-RS resource 3 are set to the dependent CSI process, 4 CSI-RSs have the same RI set {1,2} via CBSR of each of the CSI-RSs.

And, if the subframe sets $C_{CSI,0}$ and $C_{CSI,1}$ for performing resource-restrictive measurement are set to both a reference CSI process and a dependent CSI process, all CSI-RS resources configured in the reference CSI process and the dependent CSI process have the same RI sets via CBSR and it may have the same RI sets between subframe sets different from each other in each of the CSI-RS resources. Or, all CSI-RS resources configured in the reference CSI process and the dependent CSI process have the same RI sets via CBSR for each subframe set. It is not necessary for RI sets to be identical to each other between subframe sets different from each other in each CSI-RS resource.

In addition, if the subframe sets $C_{CSI,0}$ and $C_{CSI,1}$ for performing resource-restrictive measurement are set to either the reference CSI process or the dependent CSI process, all CSI-RS resources configured in the reference CSI process and the dependent CSI process have the same RI sets via CBSR. And, it may have the same RI sets between subframe sets different from each other in each CSI-RS resource of a CSI process to which a subframe set 0 and a subframe set 1 are set.

According to the aforementioned description, when a configuration between two CSI processes is restricted, RI sets between the two CSI processes are the same all the time irrespective of a selected subframe set and a selected CSI-RS resource. As a different scheme, it may put a restriction on RI sets of a reference CSI process using a subset (or, super set) of RI sets of a dependent CSI process irrespective of a selected subframe set and a selected CSI-RS resource.

Moreover, a base station can configure the number (K) of CSI-RS resources existing in a CSI process of a reference CSI process to be 1 all the time. If the K of the reference CSI process is equal to or greater than 2, the number of ports of the reference CSI process or the number of RI sets may change according to a CRI. In this case, since a dependence relation become complicate, the K of the reference CSI process can be managed in a manner of being fixed by 1 all the time. Or, the K can be managed in a manner of being restricted by 1 all the time for both the reference CSI process and the dependent CSI process. Or, in the class B, it may be able to configure CSI inheritance as well as RI inheritance not to be applied.

Meanwhile, it may be able to define an on/off indicator of measurement restriction for a channel in a CSI process. In this case, a reference CSI process and a dependent CSI process should be identically configured for the measurement restriction. In particular, both of the two CSI processes should be configured by ON or OFF. A legacy CSI process does not have a separate indicator for the measurement restriction and is always interpreted as OFF. Similarly, the two CSI processes should be identically configured for measurement restriction on interference in a CSI process.

It may restrict two CSI processes rather than an RI set to have the same CBSR. In case of the class B that a plurality of CSI-RSs exist in a CSI process, it may restrict a plurality of the CSI-RSs to have the same CBSR.

When a reference CSI process and a dependent CSI process are configured, a base station partly loses flexibility of a CSI process configuration due to the aforementioned restriction (i.e., the number of CSI-RS ports of the two CSI processes, RI sets of the two CSI processes, K value of each CSI process, etc.). If the base station does not follow the restriction and configures the two processes to maintain the flexibility of the CSI process configuration, the two CSI processes may have a different Nk value according to a CRI selected and reported by a UE. Since CBSR is differentiated according to the CRI, the two processes may have a different RI set.

For example, when a 2-port CSI-RS resource 0 and a 4-port CSI-RS resource 1 are set to a reference CSI process, a 2-port CSI-RS resource 2 and a 4-port CSI-RS resource 3 are set to a dependent CSI process, and RI sets corresponding to CBSR 2, 4, 2, and 4 are set to CSI-RS resources 0, 1, 2, and 3, respectively, it is necessary for a UE to select a CRI of the dependent CSI process from a restricted set of CRIs in consideration of a CRI of the reference CSI process.

Figure 14:
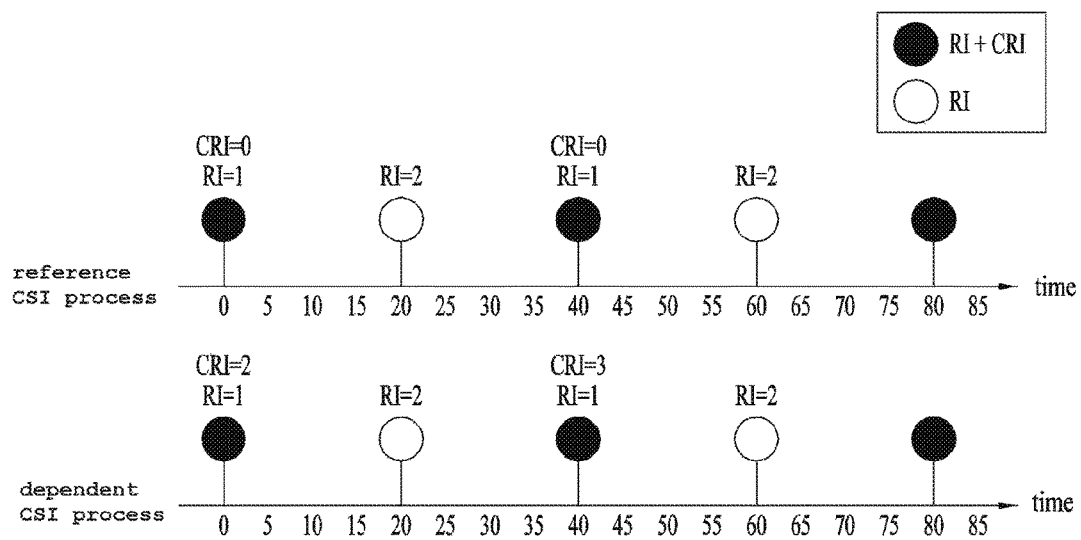
FIG. 14 illustrates an example of CRI dependency between a reference CSI process and a dependent CSI process according to an embodiment of the present invention.

FIG. 14 illustrates an example of CRI dependency between a reference CSI process and a dependent CSI process according to an embodiment of the present invention. For clarity, PMI/CQI reporting is omitted in FIG. 14. Yet, assume that a UE reports PMI/CQI to a base station between RI reporting intervals.

Referring to FIG. 14, an RI period and an offset of a reference CSI process and a dependent CSI process correspond to (20, 0) and (20, 5), respectively. A CRI has a period as much as a double of the RI period. When a UE selects a CRI of the dependent CSI process, the UE selects a CRI from a set of CRIs satisfying a specific condition to enable an RI of the dependent CSI process to inherit an RI of the reference CSI process. This is referred to as a proposal A in the following description.

In order to satisfy the specific condition, a CRI is selected from among CSI-RS resources of the dependent CSI process having the number of ports identical to the number of ports of a CSI-RS corresponding to a CRI selected from the reference CSI process. In particular, since a CRI of a most recently reported reference CSI process corresponds to 0 (i.e., 2-port CSI-RS resource 0 in table 3 in the following) in a subframe 5, a UE can select a CSI-RS resource 2 as a CRI of the dependent CSI process because the CSI-RS resource 2 has the number of ports identical to the number of ports of the CSI-RS resource 0 among the CSI-RS resource 2 and the CSI-RS resource 3. Similarly, since a CRI of a most recently reported reference CSI process corresponds to 1 (i.e., 4-port CSI-RS resource 1 in table 1) in a subframe 45, a UE can select a CSI-RS resource 3 as a CRI of the dependent CSI process because the CSI-RS resource 3 has the number of ports identical to the number of ports of the CSI-RS resource 1 among the CSI-RS resource 2 and the CSI-RS resource 3.

TABLE 3

| CSI process | CSI process relation | CSI-RS resource | RI set |
|---|---|---|---|
| CSI process 0 | reference | 2-port CSI-RS resource 0 | {1, 2} |
|  |  | 4-port CSI-RS resource 1 | {1, 2, 3, 4} |
| CSI process 1 | dependent | 2-port CSI-RS resource 2 | {1, 2} |
|  |  | 4-port CSI-RS resource 3 | {1, 2, 3, 4} |

Or, in order to satisfy the specific condition, a CRI is selected from among CSI-RS resources of the dependent CSI process having the number of ports equal to or greater than the number of ports of a CSI-RS corresponding to a CRI selected from the reference CSI process.

Or, in order to satisfy the specific condition, a CRI is selected from among CSI-RS resources of the dependent CSI process having RI sets identical to RI sets of a CSI-RS corresponding to a CRI selected from the reference CSI process. In particular, since a CRI of a most recently reported reference CSI process corresponds to 0 (i.e., 2-port CSI-RS resource 0 in table 1) in a subframe 5, a UE can select a CSI-RS resource 2 having an RI set identical to an RI set of the CSI-RS resource 0 among the CSI-RS resource 2 and the CSI-RS resource 3. Similarly, since a CRI of a most recently reported reference CSI process corresponds to 1 (i.e., 4-port CSI-RS resource 1 in table 1) in a subframe 45, a UE can select a CSI-RS resource 3 having an RI set identical to an RI set of the CSI-RS resource 1 among the CSI-RS resource 2 and the CSI-RS resource 3.

Or, in order to satisfy the specific condition, a CRI is selected from among CSI-RS resources of the dependent CSI process having an RI set identical to an RI set of a CSI-RS corresponding to a CRI selected from the reference CSI process or an RI set corresponding to a super set (or, a subset).

Or, a CRI is selected from CSI-RS resources of the dependent CSI process satisfying various conditions among the aforementioned conditions (number of ports and RI set).

According to the aforementioned proposal (i.e., proposal A), when a dependent CSI process and a reference CSI process are able to have a different Nk value or a different RI set according to a CRI in the class B, a UE selects a CRI from a set of CRIs satisfying a specific condition to enable an RI of the dependent CSI process to inherit an RI of the reference CSI process when a CRI of the dependent CSI process is selected. Additionally, in order to guarantee to properly operate the present specification, a base station always configure RI periods or CRI periods of the two CSI processes to be the same while configuring a different offset.

According to the aforementioned proposal (i.e., proposal A), when a UE selects a CRI of a dependent CSI process, if there is no CRI satisfying the restriction condition, the UE can perform one of operations described in the following.

The UE reports a determined specific CRI value. For example, the UE can report a CRI of a lowest index. Or, the UE can report a CRI corresponding to a CSI-RS of which a maximum RI is the smallest in an RI set or a CRI corresponding to a CSI-RS of which the number of ports is the smallest.

The UE independently calculates and reports a CRI without inheritance. In particular, when the UE selects a CRI of a dependent CSI process, the UE selects the CRI on the basis of reception SNR irrespective of a CSI value of a reference CSI process.

Since it is able to configure a plurality of CSI-RS resources to a single CSI process in the class B, it may be able to introduce not only a CSI inheritance concept between CSI processes but also a CSI inheritance concept between CSI-RS resources. For example, a CSI process 0 and a CSI process 1 are configured as a reference CSI process and a dependent CSI process, respectively. And, a random CSI-RS resource configured in the dependent CSI process inherits CSI (e.g., RI) of a random CSI-RS resource configured in the reference CSI process. To this end, a base station informs a UE of a CSI-RS resource of the dependent CSI process connected with a CSI-RS resource of the reference CSI process.

More specifically, as shown in Table 4, if CSI-RS resources 0 and 1 are configured to a CSI process 0 and CSI-RS resources 2 and 3 are configured to a CSI process 1, a base station informs a UE that the CSI-RS resource 2 is connected with the CSI-RS resource 0 and inherits CSI of the CSI-RS resource 0. In this case, if the CSI-RS resource 3 has no CSI-RS resource connected with the CSI-RS resource 3, the CSI-RS resource 3 does not inherit CSI while existing in the dependent CSI process and CSI is independently calculated. If two CSI-RS resources are connected with each other through inheritance, legacy restriction is applied to the resources. Hence, the CSI-RS resources have the same number of ports and the same RI set. The same RI set exists between subframe sets. The base station can inform the UE of a dependent relation between CSI-RSs. As a simple method, it may be able to regulate an $i^{th}$ CSI-RS resource of the reference CSI process to be 1:1 connected with an $i^{th}$ CSI-RS resource of the dependent CSI process. In particular, the CSI-RS resource 0 is connected with the CSI-RS resource 2 and the CSI-RS resource 1 is connected with the CSI-RS resource 3.

TABLE 4

| CSI process | CSI process relation | CSI-RS resource | CSI-RS dependent relation |
|---|---|---|---|
| CSI process 0 | reference | 2-port CSI-RS resource 0 | Reference CSI process of CSI-RS resource 2 |
| | | 4-port CSI-RS resource 1 | N.A. |
| CSI process 1 | dependent | 2-port CSI-RS resource 2 | Dependent CSI process of CSI-RS resource 0 |
| | | 4-port CSI-RS resource 3 | N.A. |

Or, it may be able to define a reference CSI-RS and a dependent CSI-RS according to a CSI-RS resource defined in a CSI process without applying a concept of a reference CSI process and a dependent CSI process in a CSI process unit. For example, as shown in Table 5, a CSI-RS 0 of a CSI process 0 is defined as a reference CSI-RS and a CSI-RS 2 of a CSI process 1 inherits CSI of the CSI-RS 0. And, a CSI-RS 3 of a CSI process 1 is defined as a reference CSI-RS and a CSI-RS 1 of a CSI process 0 inherits CSI of the CSI-RS 3. A base station informs a UE of a connection relation between the CSI-RSs.

TABLE 5

| CSI process | CSI process relation | CSI-RS resource | CSI-RS dependent relation |
|---|---|---|---|
| CSI process 0 | N.A. | 2-port CSI-RS resource 0 | Reference CSI process of CSI-RS resource 2 |

TABLE 5-continued

| CSI process | CSI process relation | CSI-RS resource | CSI-RS dependent relation |
|---|---|---|---|
| | | 4-port CSI-RS resource 1 | Dependent CSI process of CSI-RS resource 3 |
| CSI process 1 | N.A. | 2-port CSI-RS resource 2 | Dependent CSI process of CSI-RS resource 0 |
| | | 4-port CSI-RS resource 3 | Reference CSI process of CSI-RS resource 1 |

Or, it may be able to define a reference CSI-RS and a dependent CSI-RS between CSI-RS resources defined in a CSI process. For example, as shown in Table 6, a CSI-RS 1 of a CSI process 0 is defined as a dependent CSI-RS and inherits CSI of a CSI-RS 0 of the CSI process 0. A base station informs a UE of a connection relation between CSI-RSs. The inheritance within a CSI process can be more appropriate for aperiodic PUSCH CSI feedback. To this end, it is necessary to report CSI of two or more CSI-RSs existing in a CSI process at the same time by triggering the aperiodic PUSCH CSI feedback.

TABLE 6

| CSI process | CSI process relation | CSI-RS resource | CSI-RS dependent relation |
|---|---|---|---|
| CSI process 0 | N.A. | 2-port CSI-RS resource 0 | Reference of CSI-RS resource 1 |
| | | 4-port CSI-RS resource 1 | Dependent of CSI-RS resource 0 |

And, since a CRI and an RI are always reported together, it is necessary to determine whether or not the CRI is inherited when RI inheritance is applied. CRI inheritance shall be described later after four cases are described.

Figure 15:
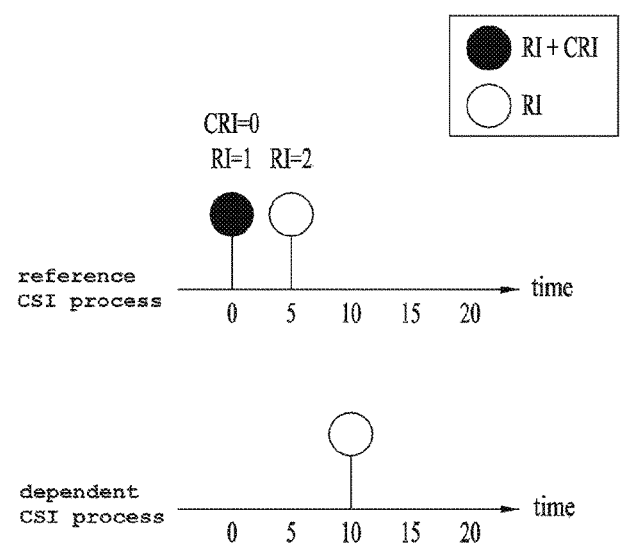
FIG. 15 shows a first case that illustrates a relation between RI inheritance and CRI inheritance according to an embodiment of the present invention.

FIG. 15 shows a first case that illustrates a relation between RI inheritance and CRI inheritance according to an embodiment of the present invention.

Referring to the first case shown in FIG. 15, an RI of a dependent CSI process follows a most recently transmitted RI value of a reference CSI process. In particular, the RI of the dependent CSI process inherits an RI value of the reference CSI process of a subframe 5 in a subframe 10. A CRI value is determined irrespective of the reference CSI process in the subframe 10. Or, a CRI value is selected from a specific CRI set according to the proposal A and the selected CRI value is reported. Or, a most recently transmitted CRI value of the reference CSI process is inherited as a CRI value in the subframe 10. Consequently, a CRI value of a subframe 0 is inherited. Or, a CRI and an RI of the subframe 10 inherit a most recently transmitted CRI and an RI of the reference CSI process. Consequently, the CRI and the RI of the subframe 10 inherit a CRI and an RI of the subframe 0.

If K of a reference CSI process corresponds to 1 or the reference CSI process is configured as a legacy CSI process without class designation and a dependent CSI process is configured as class B that K is greater than 1, in FIG. 15, a CRI of the reference CSI process is not reported and an RI is always reported without an CRI. In this case, a CRI of the dependent CSI process is determined irrespective of the reference CSI process and an RI of the dependent CSI process follows a most recently transmitted RI value of the reference CSI process, i.e., an RI transmitted in a subframe 5.

On the contrary, if K of a dependent CSI process corresponds to 1 or the dependent CSI process is configured as a legacy CSI process without class designation and the dependent CSI process is configured as class B that K is greater than 1, in FIG. 15, a CRI of the dependent CSI process is not reported and an RI is always reported without an CRI. In this case, an RI of the dependent CSI process follows a most recently transmitted RI value of the reference CSI process, i.e., an RI transmitted in a subframe 5.

FIG. 16 shows a second case that illustrates a relation between RI inheritance and CRI inheritance according to an embodiment of the present invention.

Referring to FIG. 16, an RI of a dependent CSI process follows a most recently transmitted RI value of a reference CSI process. In particular, the RI of the dependent CSI process inherits an RI value of the reference CSI process of a subframe 0 in a subframe 5. A CRI value is determined irrespective of the reference CSI process in the subframe 5. Or, a CRI value is selected from a specific CRI set according to the proposal A and the selected CRI value is reported. Or, a most recently transmitted CRI value of the reference CSI process is inherited as a CRI value in the subframe 5. Consequently, a CRI value of a subframe 0 is inherited.

If K of a reference CSI process corresponds to 1 or the reference CSI process is configured as a legacy CSI process without class designation and a dependent CSI process is configured as class B that K is greater than 1, in FIG. 16, a CRI of the reference CSI process is not reported and an RI is always reported without an CRI. In this case, a CRI of the dependent CSI process is determined irrespective of the reference CSI process and an RI of the dependent CSI process follows a most recently transmitted RI value of the reference CSI process, i.e., an RI transmitted in a subframe 0.

On the contrary, if K of a dependent CSI process corresponds to 1 or the dependent CSI process is configured as a legacy CSI process without class designation and the reference CSI process is configured as class B that K is greater than 1, in FIG. 16, a CRI of the dependent CSI process is not reported and an RI is always reported without an CRI. (i.e., RI+CRI report type of the dependent CSI process is replaced with an RI.) In this case, an RI of the dependent CSI process follows a most recently transmitted RI value of the reference CSI process, i.e., an RI transmitted in a subframe 0.

FIG. 17 shows a third case that illustrates a relation between RI inheritance and CRI inheritance according to an embodiment of the present invention.

Referring to FIG. 17, a collision occurs in RI+CRI reporting of two CSI processes in a subframe 10. In this case, it is able to see that RI+CRI reporting of a dependent CSI process is dropped and RI+CRI of a reference CSI process is reported. In this case, PMI/CQI of the dependent CSI process is calculated on the basis of a most recently reported RI value of the reference CSI process, i.e., an RI value of the reference CSI process in a subframe 10, at the timing at which the collision occurs until a next RI value of the dependent CSI process is reported after the subframe 10. And, the PMI/CQI is calculated on the basis of a most recently reported CRI value in a CSI process of the PMI/CQI, i.e., a CRI of a subframe 0. Or, the PMI/CQI is calculated on the basis of a CRI and an RI of a most recently reported reference CSI process of the reference CSI process, i.e., a CRI and an RI of the subframe 10.

If K of a reference CSI process corresponds to 1 or the reference CSI process is configured as a legacy CSI process without class designation and a dependent CSI process is configured as class B that K is greater than 1, in FIG. 17, a CRI of the reference CSI process is not reported and an RI is always reported without an CRI. In this case, PMI/CQI of the dependent CSI process is calculated on the basis of a most recently reported RI value of the reference CSI process, i.e., an RI value of the reference CSI process in a subframe 10, at the timing at which the collision occurs until a next RI value of the dependent CSI process is reported after the subframe 10. And, the PMI/CQI is calculated on the basis of a most recently reported CRI value in a CSI process of the PMI/CQI, i.e., a CRI of a subframe 0. A CRI of the dependent CSI process is determined irrespective of the reference CSI process.

On the contrary, if K of a dependent CSI process corresponds to 1 or the dependent CSI process is configured as a legacy CSI process without class designation and the reference CSI process is configured as class B that K is greater than 1, in FIG. 17, a CRI of the dependent CSI process is not reported and an RI is always reported without an CRI. In this case, PMI/CQI of the dependent CSI process is calculated on the basis of a most recently reported RI value of the reference CSI process, i.e., an RI value of the reference CSI process in a subframe 10, at the timing at which the collision occurs until a next RI value of the dependent CSI process is reported after the subframe 10.

The proposed scheme can be applied in a manner of more extending the third case. In particular, when a reporting type (A) including an RI, an RI and a PTI, or an RI and W1 of a dependent CSI process is collided with a reporting type (B) including an RI, an RI and a PTI, or an RI and W1 of a reference CSI process, the reporting type (A) including the RI of the dependent CSI process is dropped and the reporting type (B) including the RI of the reference CSI process can be reported. (The reporting type (A) and the reporting type (B) may be the same or not.) In this case, PMI/CQI of the dependent CSI process is calculated on the basis of the RI of the reporting type B, the RI and the PTI of the reporting type B, or the RI and the W1 of the reporting type B until a next RI is reported after the collision.

On the contrary, if the type (A) is reported without being collided with the reference CSI process or the type (A) having a higher priority is reported despite of a collision, the RI of the type (A), the RI and the PTI of the type (A), or the RI and W1 of the type (A) inherits an RI of a most recently reported type (B), the RI and PTI of the type (B), or the RI and W1 of the type (B) at the timing prior to the timing at which the type (A) is reported.

If the type (A) reporting is not collided with the type (B) reporting, the RI of the type (A), the RI and the PTI of the type (A), or the RI and W1 of the type (A) inherits an RI of a most recently reported type (B), the RI and PTI of the type (B), or the RI and W1 of the type (B) at the timing prior to the timing at which the type (A) is reported. The type (A) and the type (B) may or may not include a CRI. An inheritance scheme of RI, RI+PTI, or RI+W1 identically operates irrespective of whether or not a CRI is included in the type (A) and the type (B).

Figure 18:
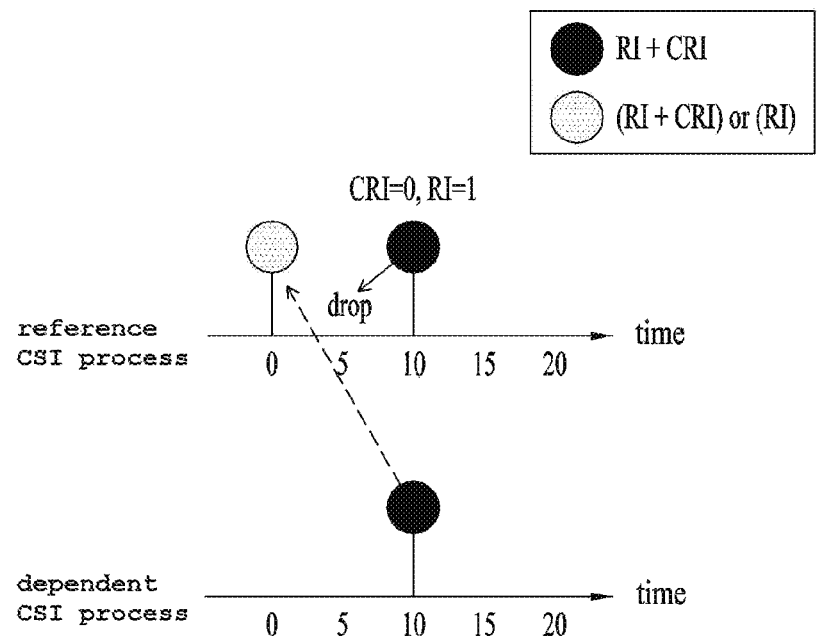
FIG. 18 shows a fourth case that illustrates a relation between RI inheritance and CRI inheritance according to an embodiment of the present invention.

FIG. 18 shows a fourth case that illustrates a relation between RI inheritance and CRI inheritance according to an embodiment of the present invention.

Referring to FIG. 18, a collision occurs in RI+CRI reporting of two CSI processes in a subframe 10. In this case, it is able to see that RI+CRI reporting of a reference CSI process is dropped and RI+CRI of a dependent CSI process is reported. In this case, similar to the first case or the second case, an RI and a CRI of the dependent CSI process are determined. In particular, when an RI of the reference CSI process is most recently reported in a subframe 0, if an RI and a CRI are reported together in the subframe 0, inheritance is determined using the scheme of the second case. On the other hand, if an RI is reported without a CRI, inheritance is determined using the scheme of the first case.

In FIG. 18, when the reference CSI process reports an RI without a CRI in a subframe 10, if a collision occurs, the RI of the reference CSI process is dropped and an RI and a CRI of the dependent CSI process are determined using the aforementioned scheme in a manner of being identical to the first case or the second case.

If K of a reference CSI process corresponds to 1 or the reference CSI process is configured as a legacy CSI process without class designation and a dependent CSI process is configured as class B that K is greater than 1, in FIG. 18, a CRI of the reference CSI process is not reported and an RI is always reported without an CRI. In this case, a CRI of the dependent CSI process is determined irrespective of the reference CSI process and an RI of the dependent CSI process follows a most recently transmitted RI of the reference CSI process, i.e., an RI transmitted in a subframe 0.

On the contrary, if K of a dependent CSI process corresponds to 1 or the dependent CSI process is configured as a legacy CSI process without class designation and the reference CSI process is configured as class B that K is greater than 1, in FIG. 18, a CRI of the dependent CSI process is not reported and an RI is always reported without an CRI. In this case, an RI of the dependent CSI process follows a most recently transmitted RI of the reference CSI process, i.e., an RI transmitted in a subframe 0.

Each of the cases and the proposals has been explained with a case of reporting an RI and a CRI together of a dependent CSI process as an example. Yet, the cases and the proposals can be extensively applied to a case that an RI, a CRI, and W1 of the dependent CSI process are reported together and a case that an RI, a CRI, and a PTI of the dependent CSI process are reported together. In particular, an RI reported in the reference CSI process and the dependent CSI process can be applied in a manner of being replaced with RI+W1. And, the RI reported in the reference CSI process and the dependent CSI process can be applied in a manner of being replaced with RI+PTI.

For example, in the first case of FIG. 15, the RI+CRI reporting type is replaced with RI+W1+CRI and the RI reporting type is replaced with RI+W1. The description of FIG. 15 is changed as follows. (In case of reporting PTI instead of W1, the W1 can be applied in a manner of being changed into the PTI.)

Specifically, in the first case of FIG. 15, the RI of the dependent CSI process follows a most recently transmitted RI value of the reference CSI process. In particular, an RI of a dependent CSI process in a subframe 10 inherits an RI value of a reference CSI process in a subframe 5. In the subframe 10, a CRI value is determined irrespective of a reference CSI process. Or, the CRI value is selected from a specific CRI set and the selected CRI value is reported. Or, in the subframe 10, the CRI value inherits a most recently transmitted CRI value of a reference CSI process. Consequently, the CRI value inherits a CRI value of a subframe 0. Or, a CRI and an RI of the subframe 10 inherit values of most recently transmitted CRI and RI of a reference CSI process. Consequently, the CRI and the RI of the subframe 10 inherit a CRI and an RI of a subframe 0.

W1 of a dependent CSI process does not have inheritance with W1 of a reference CSI process. The W1 of the dependent CSI process is calculated on the basis of an RI and a CRI transmitted together with W1 in a subframe 10. Or, similar to the RI, the W1 of the dependent CSI process may have inheritance with the W1 of the reference CSI process. In this case, the RI of the dependent CSI process, which is transmitted together with the W1 of the dependent CSI process, searches for an inherited RI of a reference CSI process and inherits W1 of the reference CSI process transmitted together with the RI of the reference CSI process. In particular, the W1 of the dependent CSI process follows the most recently transmitted W1 of the reference CSI process.

If K of a reference CSI process corresponds to 1 or the reference CSI process is configured as a legacy CSI process without class designation and a dependent CSI process is configured as class B that K is greater than 1, in FIG. 15, a CRI of the reference CSI process is not reported and RI+W1 is always reported without an CRI. In particular, in the first case of FIG. 15, both RI+CRI of the reference CSI process and the RI reporting type are replaced with RI+W1 and the RI+CRI reporting type of the dependent CSI process is replaced with RI+W1+CRI. In this case, the CRI of the dependent CSI process is determined irrespective of the reference CSI process and the RI of the dependent CSI process follows a most recently transmitted RI of the reference CSI process, i.e., an RI transmitted in a subframe 5. The W1 of the dependent CSI process does not have inheritance with the W1 of the reference CSI process and is calculated on the basis of an RI and a CRI transmitted together with W1 in a subframe 10. Or, similar to the RI, the W1 of the dependent CSI process may have inheritance with the W1 of the reference CSI process. In this case, the RI of the dependent CSI process, which is transmitted together with the W1 of the dependent CSI process, searches for an inherited RI of a reference CSI process and inherits W1 of the reference CSI process transmitted together with the RI of the reference CSI process. In particular, the W1 of the dependent CSI process follows the most recently transmitted W1 of the reference CSI process.

On the contrary, if K of a dependent CSI process corresponds to 1 or the dependent CSI process is configured as a legacy CSI process without class designation and the reference CSI process is configured as class B that K is greater than 1, in FIG. 15, a CRI of the dependent CSI process is not reported and an RI is always reported without an CRI. In particular, in the first case of FIG. 15, RI+CRI of the reference CSI process and the RI reporting type are replaced with RI+W1+CRI and RI+W1, respectively. And, the RI+CRI reporting type of the dependent CSI process is replaced with RI+W1. In this case, the RI of the dependent CSI process follows a most recently transmitted RI of the reference CSI process, i.e., an RI transmitted in a subframe 5. The W1 of the dependent CSI process does not have inheritance with the W1 of the reference CSI process and is calculated on the basis of an RI transmitted together with W1 in a subframe 10. Or, similar to the RI, the W1 of the dependent CSI process may have inheritance with the W1 of the reference CSI process. In this case, the RI of the dependent CSI process, which is transmitted together with the W1 of the dependent CSI process, searches for an inherited RI of a reference CSI process and inherits W1 of the reference CSI process transmitted together with the RI of the reference CSI process. In particular, the W1 of the dependent CSI process follows the most recently transmitted W1 of the reference CSI process.

In the third case of FIG. 17, the RI+CRI reporting type is replaced with RI+W1+CRI and PMI of PMI/CQI corresponds to W2. And, the description of FIG. 17 is changed as follows. (In case of reporting PTI instead of W1, the W1 can be applied in a manner of being changed into the PTI. In this case, PMI among PMI/CQI may correspond to W1 or W2.)

Specifically, referring to FIG. 17, a collision occurs in RI+W1+CRI reporting of two CSI processes in a subframe 10. In this case, it is able to see that RI+W1+CRI reporting of a dependent CSI process is dropped and RI+W1+CRI of a reference CSI process is reported. In this case, PMI/CQI of the dependent CSI process is calculated on the basis of most recently reported RI and W1 values of the reference CSI process, i.e., RI and W1 values of the reference CSI process in a subframe 10, at the timing at which the collision occurs until a next RI+W1 value of the dependent CSI process is reported after the subframe 10. And, W2/CQI is calculated on the basis of a most recently reported CRI value in a CSI process of the W2/CQI. Or, the W2/CQI is calculated on the basis of a most recently reported CRI value, RI, and W1 of the reference CSI process, i.e., CRI, RI, and W1 of the subframe 10.

If K of a reference CSI process corresponds to 1 or the reference CSI process is configured as a legacy CSI process without class designation and a dependent CSI process is configured as class B that K is greater than 1, in FIG. 17, a CRI of the reference CSI process is not reported and an RI is always reported without an CRI. (In particular, RI+CRI reporting type of the reference CSI process is replaced with RI+W1 and RI+CRI reporting type of the dependent CSI process is replaced with RI+W1+CRI.) In this case, PMI/CQI of the dependent CSI process is calculated on the basis of most recently reported RI and W1 values of the reference CSI process, i.e., RI and W1 values of the reference CSI process in a subframe 10, at the timing at which the collision occurs until a next RI value of the dependent CSI process is reported after the subframe 10. And, the PMI/CQI is calculated on the basis of a most recently reported CRI value in a CSI process of the PMI/CQI, i.e., a CRI of a subframe 0. A CRI of the dependent CSI process is determined irrespective of the reference CSI process.

On the contrary, if K of a dependent CSI process corresponds to 1 or the dependent CSI process is configured as a legacy CSI process without class designation and a reference CSI process is configured as class B that K is greater than 1, in FIG. 17, a CRI of the dependent CSI process is not reported and an RI is always reported without an CRI. (In particular, RI+CRI reporting type of the dependent CSI process is replaced with RI+W1 and RI+CRI reporting type of the reference process is replaced with RI+W1+CRI.) In this case, PMI/CQI of the dependent CSI process is calculated on the basis of most recently reported RI and W1 values of the reference CSI process, i.e., RI and W1 values of the reference CSI process in a subframe 10, at the timing at which the collision occurs until a next RI value of the dependent CSI process is reported after the subframe 10.

According to the present specification, the CRI of the dependent CSI process can be determined irrespective of the CRI of the reference CSI process without inheritance. Yet, the RI value of the dependent CSI process inherits the RI of the reference CSI process. Hence, when a UE selects the CRI of the dependent CSI process, the UE can be affected by the RI value of the reference CSI process. In particular, if the RI of the reference CSI process is configured by x, the RI value of the dependent CSI process corresponds to x. Hence, the UE can select an optimized CRI value under the assumption that the RI value corresponds to x.

In the first to the fourth cases, it is basically assumed that a CRI of a reference CSI process and a CRI of a dependent CSI process are transmitted together with an RI. In this case, for example, when the CRI of the dependent CSI process and the RI are transmitted together, if an interval of the CRI is determined by M multiple of an interval of the RI, the RI can be reported without the CRI unless the M corresponds to 1. In this case, similar to FIG. 15, the RI inherits a most recently reported reference RI (=an RI of the reference CSI process). For example, in FIGS. 16 to 18, although a CRI and an RI are transmitted together, a reporting type for transmitting the RI without the CRI or a reporting type for transmitting both the CRI and the RI can be transmitted depending on the M. Although the RI is transmitted without the CRI of the dependent CSI process, a dependent RI inherits a most recently reported reference RI (i.e., the RI of the reference CSI process).

Meanwhile, when PUCCH/PUSCH feedback is performed, if a reporting mode of a class B CSI process is configured by 1-0, 2-0, or 3-0, it may operate in either "without RI and PMI mode" or "without PMI mode" depending on whether or not an RI is reported. According to the "without RI and PMI mode", an RI and a PMI are not reported. According to the "without PMI mode", a PMI is not reported while an RI is reported. (If K is greater than 1, a CRI is fed back irrespective of whether or not an RI and a PMI are reported.) Since an RI and a CRI are reported in the "without PMI mode", the reporting mode 1-0, 2-0, or 3-0 may apply RI inheritance or CRI inheritance between two processes. Yet, the two processes should be configured with the same reporting mode ("without PMI mode").

Figure 19:
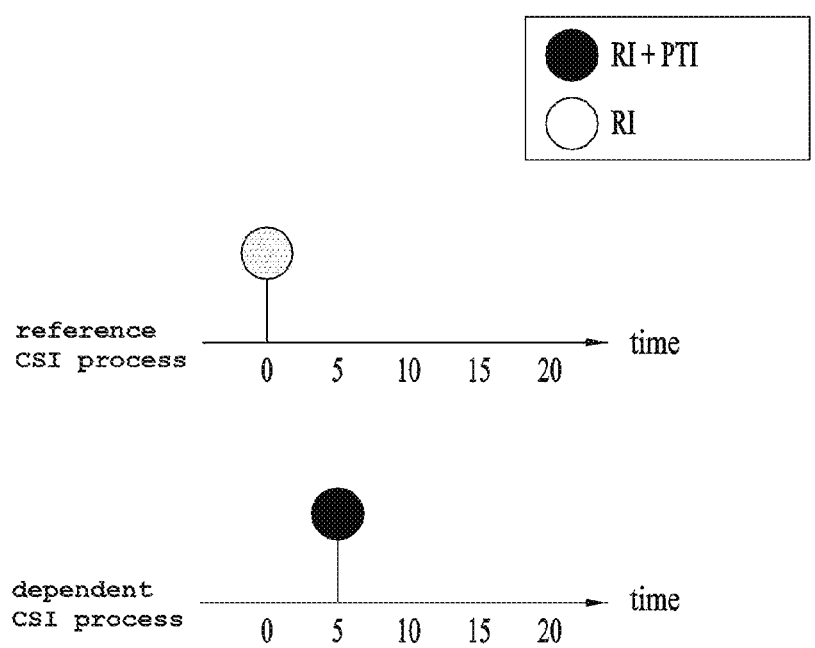
FIG. 19 is a diagram illustrating PTI inheritance of a dependent CSI process according to a configuration of a reference CSI process.

In the following, PTI inheritance of a dependent CSI process according to a configuration of a reference CSI process is explained. FIG. 19 is a diagram illustrating PTI inheritance of a dependent CSI process according to a configuration of a reference CSI process.

Referring to FIG. 19, a reference CSI process is configured by 8-port CSI-RS, class B, K=1, and PMI-Config=1 (i.e., W2 only feedback) and a dependent CSI process is configured by 8-port CSI-RS, class B, K=1, and PMI-Config=2 (i.e., W1 and W2 feedback). Both of the reference CSI process and the dependent CSI process report CSI in a PUCCH feedback mode 2-1. As a result, an RI of the reference CSI process is solely reported without a PTI and the dependent CSI process reports a PTI and an RI together. According to a legacy spec, when the PTI and the RI are reported together, the dependent CSI process inherits not only an RI value but also a PTI value of the reference CSI process. Yet, if the abovementioned configuration is applied, since a PTI is not transmitted to the reference CSI process, it is necessary to change a UE operation. In particular, while the dependent CSI process reports the PTI and the RI together, the dependent CSI process inherits the RI of the reference CSI process only and the PTI of the reference CSI process is not inherited to a different CSI process. The PTI of the reference CSI process is independently determined.

In order to prevent the abovementioned exceptional case in advance, a base station may put an additional restriction on the configuration of the two CSI processes. In particular, the two CSI processes are configured by adding a condition that the same value is to be configured when there is PMI-Config as well as a condition of the same port number and a condition of the same RI set. Or, it may be able to configure the reference CSI process not to have PMI-Config=1. Or, if the PMI-Config of the reference CSI process corresponds to 1, it may be able to configure the PMI-config of the dependent CSI process to be 1 all the time.

The abovementioned exceptional case appears on a legacy system as well. For example, if 4-port CSI-RS and a legacy Rel-12 4Tx codebook are set to a reference CSI process, 4-port CSI-RS and a legacy Rel-8 4Tx codebook are set to a dependent CSI process, and both of the two CSI processes report CSI using a PUCCH feedback mode 2-1, the problem mentioned earlier in FIG. 19 identically occurs. In order to solve the problem, it may inherit an RI only except a PTI. Or, if the two CSI processes are configured by 4 ports, it may be able to configure the two CSI processes to have the same codebook.

In class A, it may follow a legacy configuration restriction between a reference CSI process and a dependent CSI process as it is. Yet, it is necessary to apply a restriction, which is applied to the number of ports and an RI set, on the basis of the total number of ports of aggregated CSI-RSs of multiple CSI-RSs set to a single CSI process and an RI set applied to CSI which is calculated based on the aggregated CSI-RSs.

Hence, when CSI is inherited between class A CSI processes, it may restrict codebooks of two CSI processes or N1 (number of horizontal antenna ports) of the codebooks, N2 (number of vertical antenna ports), O1 (number of horizontal DFT oversampling), and O2 (number of vertical DFT oversampling) to be the same. In the class A, since it is able to configure 4 codebooks in total, a base station informs a UE of one of the 4 codebooks. And, the base station informs the UE of the N1, the N2, the O1, and the O2 of the codebook.

If the class A and the class B are connected with each other via inheritance, it may be able to apply the aforementioned restriction. In particular, the proposed restriction is applied in a manner of comparing the total number of ports of aggregated CSI-RSs of a class A CSI process and an RI set applied to CSI, which is calculated based on the aggregated CSI-RSs, with the number of ports of a CSI-RS of a class B process and an RI set applied to CSI, which is calculated based on a CSI-RS.

Or, it may restrict inheritance to be existed between CSI processes of the same class only. Yet, in this case, since a legacy CSI process, which has no class concept, is identical to a class B process of which K corresponds to 1, inheritance between the class B process and the legacy CSI process is still available. If the inheritance between the legacy CSI process and the class B process is not available due to a certain reason, a base station configures the class B process of which K corresponds to 1 instead of the legacy CSI process to make inheritance exist between the CSI process and a different class B process.

When CSI reported in a dependent CSI process is configured to inherit CSI of a reference CSI process, if a recently reported reference RI and reference CSI do not exist, a UE may report a predefined specific CSI (e.g., RI=1) or CSI calculated based on the dependent CSI process without applying inheritance temporarily.

As mentioned in the foregoing description, in case of the class A CSI processes, since one CSI process includes a CSI-RS, there is no problem in applying a legacy RI inheritance. Yet, in case of the class B CSI processes, if a CSI-RS is selected by a CRI in a single CSI process, inheritance of an RI may vary according to the CRI. Hence, the present invention proposes a method of performing CSI feedback using A) or B) described in the following.

A) First of all, it may be able to similarly apply a restriction on a legacy RI inheritance. In particular, a CSI-RS in a reference CSI process and a CSI-RS in a dependent CSI process are defined by the same number of antenna ports. And, the reference CSI process and the dependent CSI process are configured by the same RI restriction set by CBSR. Hence, RI inheritance can be similarly applied irrespective of a CRI.

However, when K corresponds to 1, if the reference CSI process and the dependent CSI process have a different PMI-Config value, a reporting type of the reference CSI process becomes different from a reporting type of the dependent CSI process. Hence, in this case, it is necessary to consider a new method.

Figure 20:
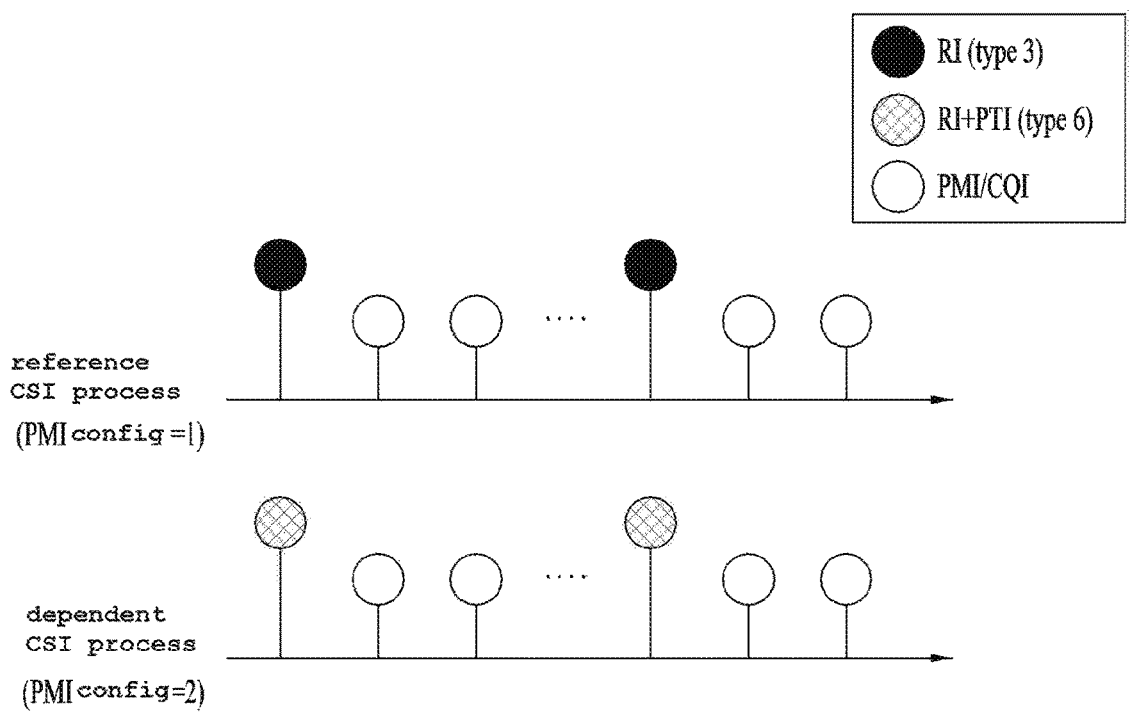
FIG. 20 illustrates an example of performing CSI reporting according to an embodiment of the present invention.

FIG. 20 illustrates an example of performing CSI reporting according to an embodiment of the present invention. In particular, in FIG. 20, assume that both a reference CSI process and a dependent CSI process include K=1, class B, and 8-port CSI-RS.

According to the related art, an RI and a PTI of a most recently reported reference CSI process are inherited as an RI and a PTI of a dependent CSI process. Yet, referring to FIG. 20, it is able to see that there is no PTI in the reference CSI process. And, it is necessary to examine RI inheritance when a reporting type 3 consisting of an RI only is collided with a reporting type 6 consisting of an RI and a PTI.

In this case, if PMI-config is configured by 1 in one of two CSI processes, it is preferable to configure PMI-config by 1 in another CSI process as well. Of course, it is necessary to be cautious that there is no problem in inheriting an RI between a class B CSI process of which K is equal to or greater than 2 and a class B CSI process of which K corresponds to 1 and PMI-config corresponds to 2.

Referring back to FIG. 20, a UE selects an optimized PTI on the basis of the RI transmitted together with the PTI and a CSI-RS of the dependent CSI process without inheriting the PTI of the dependent CSI process. In particular, when the reporting type 3 is collided with the reporting type 6 and the reporting type 3 is reported, PMI/CQI of the dependent CSI process is calculated as follows until a next RI is reported from the timing appearing after the collision.

The PMI/CQI is calculated on the basis of an RI value of the reference CSI process which is reported at the timing of collision.

The PMI/CQI is calculated on the basis of a PTI value of a most recently reported dependent CSI process.

In FIG. 20, when the reference CSI process is configured by PMI config=2 and the dependent CSI process is configured by PMI config=1, if the reporting type 3 of the dependent CSI process is collided with the reporting type 6 of the reference CSI process and the reporting type 6 is reported, the PMI/CQI of the dependent CSI process is calculated on the basis of an RI of the reporting type 6, which is reported at the time of collision, until a next RI is reported from the timing appearing after the collision.

And, it is necessary to consider an additional restriction on RI inheritance between classes different from each other. Regarding this, it is explained with reference to the drawing.

Figure 21:
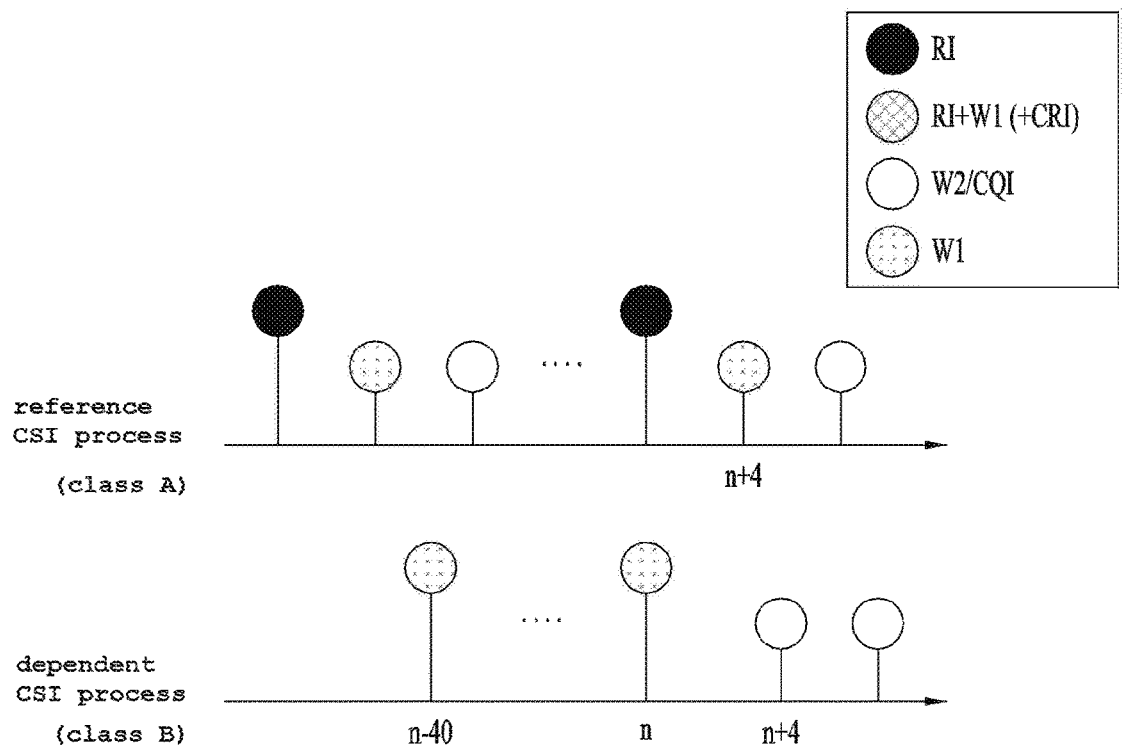
FIG. 21 illustrates a different example of performing CSI reporting according to an embodiment of the present invention.

FIG. 21 illustrates a different example of performing CSI reporting according to an embodiment of the present invention. In particular, in FIG. 21, assume that both a reference CSI process and a dependent CSI process include 8-port CSI-RS.

Referring to FIG. 21, a dependent RI is dropped in a subframe n due to a collision with a reference RI. In this case, W2/CQI in a subframe n+5 is determined based on the reference RI of the subframe n and there is no problem in inheriting an RI. Yet, if the W2/CQI is determined on the basis of W1 in a most recently reported subframe n-40, it is difficult to determine the W1 itself from the reference RI in the subframe n. As a result, the W2/CQI and the W1 are determined from a different RI.

If the W2/CQI is determined based on W1 of a reference CSI process in a subframe n+4, since a reference CSI process and a dependent CSI process use a different codebook, a problem may occur. Hence, it is preferable that the reference CSI process and the dependent CSI process have the same class.

Referring back to FIG. 21, when a collision occurs in a subframe n and an RI of a reference CSI process is reported, W2/CQI of a dependent CSI process is calculated using one of W1s described in the following until a next RI of the dependent CSI process is reported.

W1 of a most recently reported dependent CSI process

W1 of a firstly reported reference CSI process after RI collision timing n (i.e., W1 of n+4 timing)

In FIG. 21, when a collision occurs at a subframe n and an RI of a dependent CSI process is reported, W1 reported together with the RI can be calculated as follows.

An optimized W1 is calculated (in the aspect of reception SINR) on the basis of the RI transmitted together with the W1 and a CSI-RS of the dependent CSI process.

The W1 is inherited using W1 identical to W1 of a most recently transmitted reference CSI process prior to n subframe.

In summary, in order to inherit RI, RI+PTI, or RI+W1 in FD-MIMO, it is necessary to satisfy 5 restrictions described in the following.

1) A reference CSI process and a dependent CSI process should be configured by the same feedback mode.

2) A CSI-RS of a reference CSI process and a CSI-RS of a dependent CSI process should be configured by the same number of antenna ports. Although CRI reporting is set to at least one of the reference CSI process and the dependent CSI process, the CSI-RS of the reference CSI process and the CSI-RS of the dependent CSI process should be configured by the same number of antenna ports irrespective of a CRI value.

3) An RI set restricted by CBSR should be identically set to a reference CSI process and a dependent CSI process. In addition, if subframe sets for performing resource-restrictive measurement are configured, an RI set restricted by CBSR should be identically set to the subframe sets as well. Although CRI reporting is set to at least one of the reference CSI process and the dependent CSI process, the RI set restricted by CBSR should be identically set to the reference CSI process and the dependent CSI process irrespective of a CRI value.

4) If PMI-config=1 is set to one of a reference CSI process and a dependent CSI process, the PMI-config=1 should be set to another one as well.

5) Lastly, a CSI reporting type is identically set to both a reference CSI process and a dependent CSI process.

B) The proposal A) has a problem in decreasing the degree of freedom of a system. Hence, the proposal B) proposes that the restrictions 1), 4), and 5) are satisfied only among the aforementioned restrictions 1) to 5). In particular, a set restricted by an RI and the number of antenna ports may vary depending on a CRI between a reference CSI process and a dependent CSI process. Yet, it is necessary for a UE to select a CRI of a dependent CSI process to make the selected CRI to be identical to the number of antenna ports corresponding to a most recently reported CRI and a set restricted by an RI in the reference CSI process.

In addition, it is necessary for a network to provide appropriate configuration information to the reference CSI process and the dependent CSI process to enable the UE to select the CRI of the dependent CSI process at any time. In particular, when the UE selects a CRI in the reference CSI process, it is necessary for a base station to configure a CSI-RS of the dependent CSI process having the number of ports identical to that of a CSI-RS of the selected reference CSI process to be existed. Similarly, when the UE selects a CRI in the reference CSI process, it is necessary for a base station to configure a CSI-RS of the dependent CSI process having an RI set identical to an available RI set on the basis of the CSI-RS of the selected reference CSI process to be existed.

Meanwhile, in case of reporting a CRI in the class B, since various CSI-RS resources are selected according to the CRI, RI inheritance becomes complicated. In order to solve the problem, a UE does not expect to receive configurations of a dependent CSI process and a reference CSI process described in the following from a base station. Consequently, the base station does not provide the configurations to the UE. (In order to increase management flexibility of the base station, it may restrict one or a part of configurations described in the following not to be provided and it may allow the remaining configuration to be provided.)

Configuration that both a dependent CSI process and a reference CSI process correspond to class B Configuration that a dependent CSI process corresponds to class B Configuration that a reference CSI process corresponds to class B Yet, although K is configured by 1 in the class B, a CRI is not reported and a single CSI-RS is defined only in a single CSI process. Hence, it is preferable to exclude a case of configuring a reference/dependent CSI process for a case that a class corresponds to the class B and K is greater than 1 rather than a case of configuring a reference/dependent CSI process for the class B. Hence, a UE does not expect to receive configurations of a dependent CSI process and a reference CSI process described in the following from a base station. Consequently, the base station does not provide the configurations to the UE. (In order to increase management flexibility of the base station, it may restrict one or a part of configurations described in the following not to be provided and it may allow the remaining configuration to be provided.)

Configuration that both a dependent CSI process and a reference CSI process correspond to class B and K is greater than 1

Configuration that a dependent CSI process corresponds to class B and K is greater than 1

Configuration that a reference CSI process corresponds to class B and K is greater than 1

In the present specification, a class B CSI-RS corresponds to a beamformed CSI-RS and a class B CSI process corresponds to a CSI process configured by the class B CSI-RS. And, a class A CSI-RS corresponds to a non-beamformed CSI-RS and a class A CSI process corresponds to a CSI process configured by the class A CSI-RS.

And, the third case of FIG. 17 can be extended as 1) to 3) described in the following.

1) First of all, when a reporting type (A) including an RI (while W1 or a PTI is not included) of a dependent CSI process is collided with a reporting type (B) including an RI (while W1 or a PTI is not included) of a reference CSI process, the reporting type (A) of the dependent CSI process is dropped, and the reporting type (B) of the reference CSI process is reported, the proposed scheme can be applied. (Of course, the A and the B may or may not be the same reporting type according to whether or not joint encoding is performed on a CRI.) In this case, PMI/CQI of the dependent CSI process is calculated on the basis of an RI of the B until a next RI is reported after the collision.

On the contrary, if the reporting type (A) is reported without being collided with the reference CSI process or the reporting type (A) having a higher priority is reported despite of a collision, an RI of the reporting type (A) inherits an RI of a most recently reported type (B) before the reporting type (A) is reported. If the reporting type (A) is not collided with the reporting type (B), the RI of the reporting type (A) inherits an RI of a most recently reported type (B) before the reporting type (A) is reported. The type (A) and the type (B) identically operate an inheritance scheme of an RI irrespective of whether or not a CRI is included.

2) Or, when a reporting type (A) including W1 and an RI of a dependent CSI process is collided with a reporting type (B) including W1 and an RI of a reference CSI process, the reporting type (A) of the dependent CSI process is dropped, and the reporting type (B) of the reference CSI process is reported, the proposed scheme can be applied. (The type (A) and the type (B) may or may not be the same reporting type according to whether or not joint encoding is performed on a CRI.) In this case, W2/CQI of the dependent CSI process is calculated on the basis of the W1 and the RI of the type (B) until a next RI is reported after the collision. On the contrary, if the reporting type (A) is reported without being collided with the reference CSI process or the reporting type (A) having a higher priority is reported despite of a collision, the W1 and the RI of the reporting type (A) inherits W1 and RI of a most recently reported type (B) before the reporting type (A) is reported.

If the reporting type (A) is not collided with the reporting type (B), the W1 and the RI of the reporting type (A) inherits a W1 and an RI of a most recently reported type (B) before the reporting type (A) is reported. Or, if the reporting type (A) is not collided with the reporting type (B), the RI of the reporting type (A) inherits an RI value of the most recently reported type (B) before the type (A) is reported and the W1 of the type (A) is independently calculated on the basis of the RI reported together without inheriting the W1 of the type (B). Similarly, the type (A) and the type (B) identically operate an inheritance scheme of the W1 and the RI irrespective of whether or not a CRI is included.

3) Or, when a reporting type (A) including a PTI and an RI of a dependent CSI process is collided with a reporting type (B) including a PTI and an RI of a reference CSI process, the reporting type (A) of the dependent CSI process is dropped, and the reporting type (B) of the reference CSI process is reported, the proposed scheme can be applied. (The type (A) and the type (B) may or may not be the same reporting type according to whether or not joint encoding is performed on a CRI.) In this case, W2/CQI of the dependent CSI process is calculated on the basis of the PTI and the RI of the type (B) until a next RI is reported after the collision. On the contrary, if the reporting type (A) is reported without being collided with the reference CSI process or the reporting type (A) having a higher priority is reported despite of a collision, the PTI and the RI of the reporting type (A) inherits PTI and RI of a most recently reported type (B) before the reporting type (A) is reported. If the reporting type (A) is not collided with the reporting type (B), the PTI and the RI of the reporting type (A) inherits a PTI and an RI of a most recently reported type (B) before the reporting type (A) is reported. The type (A) and the type (B) identically operate an inheritance scheme of the PTI and the RI irrespective of whether or not a CRI is included.

Meanwhile, a CSI process is configured by one selected from the group consisting of "with PMI/RI reporting mode", "without PMI/RI reporting mode", and "without PMI reporting mode" according to RRC signaling transmitted by a base station. It is necessary for a dependent/reference CSI process to which RI inheritance is applied to have an RI. Hence, the two CSI processes are unable to be configured by the "without PMI/RI reporting mode". And, the two CSI processes should be configured by the same mode all the time.

In particular, if one of the two CSI processes is configured by the "with PMI/RI reporting mode", another one is configured by the "with PMI/RI reporting mode" as well. Similarly, if one of the two CSI processes is configured by the "without PMI reporting mode", another one is configured by the "without PMI reporting mode" as well.

When one of the two CSI processes is configured by the "without PMI reporting mode", if another one is configured by the "with PMI/RI reporting mode", it may report an RI using a different reporting type in the two CSI processes. (For example, in submode 1 of a PUCCH reporting mode 1-1, one CSI process reports an RI only without performing joint encoding on W1 and RI together. Another CSI process reports the RI and the WI together by performing joint encoding on the W1 and the RI.) As a result, inheritance of the W1 becomes ambiguous. (Similarly, in a PUCCH reporting mode 2-1, one CSI process reports an RI only without performing joint encoding on PTI and RI together. Another CSI process reports the PTI and the RI together by performing joint encoding on the W1 and the RI. Hence, inheritance of the PTI becomes ambiguous.) In this case, a problem similar to the problem mentioned earlier in FIGS. 20 and 21 occurs. Hence, the problem can be solved using the scheme mentioned earlier in FIGS. 20 and 21. In this case, in order to prevent the ambiguity, a base station can configure the two CSI processes using the same mode all the time.

The CSI described in the present specification may correspond to one selected from the group consisting of RI, PMI, CQI, and CRI. Or, the CSI may indicate a plurality of the information at the same time. Although the contents of the present specification are made on the basis of the RI, inheritance can be applied not only to the RI but also to different CSI such as the CRI, the PMI, the CQI, or the like. When the inheritance is applied, the inheritance can be managed using the same scheme or a similar scheme.

Figure 22:
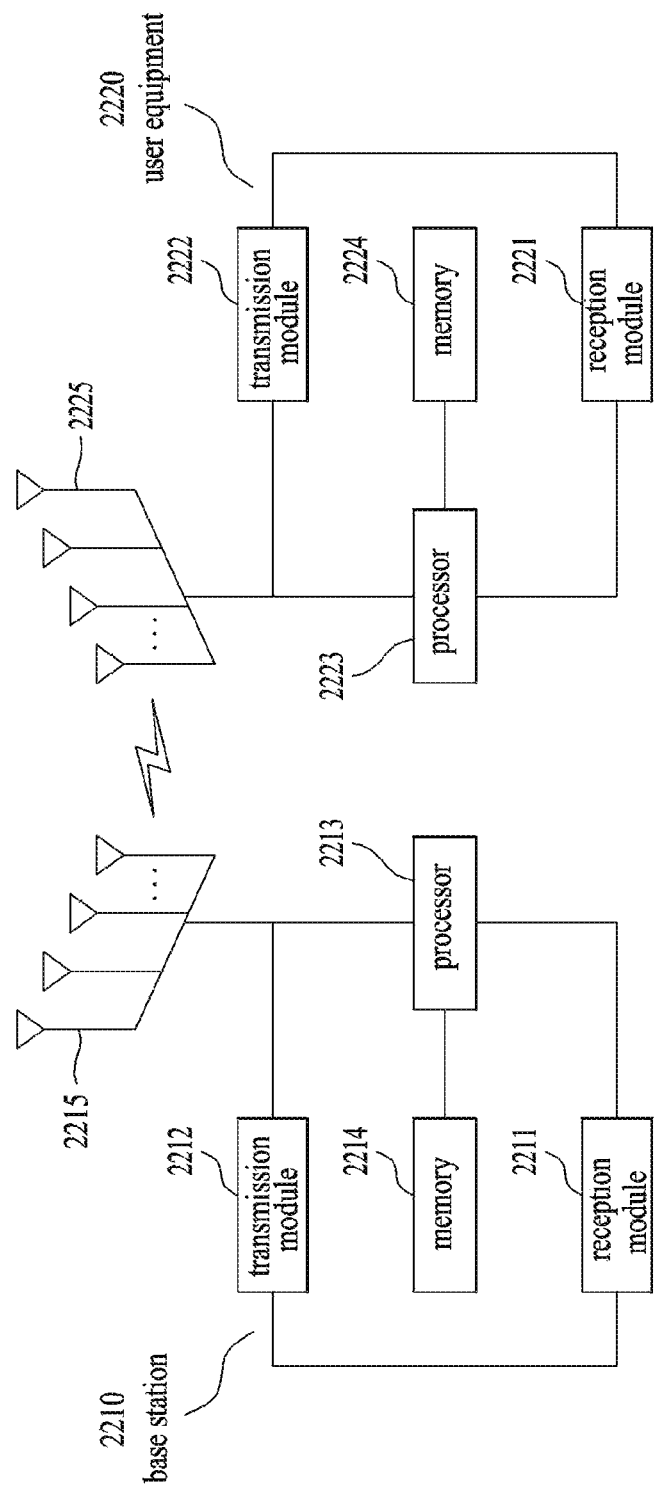
FIG. 22 is a diagram for a configuration of a base station and a user equipment applicable to one embodiment of the present invention.

FIG. 22 is a diagram for a base station and a user equipment capable of being applied to an embodiment of the present invention.

Referring to FIG. 22, a wireless communication system includes a base station (BS) 2210 and a user equipment (UE) 2220. The BS 2210 includes a processor 2213, a memory 2214 and a radio frequency (RF) units 2211/2212. The processor 2213 can be configured to implement the proposed functions, processes and/or methods. The memory 2214 is connected with the processor 2213 and then stores various kinds of information associated with an operation of the processor 2213. The RF units 2211/2212 are connected with the processor 2213 and transmits and/or receives a radio signal. The user equipment 2220 includes a processor 2223, a memory 2224 and a radio frequency (RF) unit 2221/2222. The processor 2223 can be configured to implement the proposed functions, processes and/or methods. The memory 2224 is connected with the processor 2223 and then stores various kinds of information associated with an operation of the processor 2223. The RF unit 2221/2222 is connected with the processor 2223 and transmits and/or receives a radio signal. The base station 2210 and/or the user equipment 2220 may have a single antenna or multiple antennas.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this disclosure, a specific operation explained as performed by an eNode B may be performed by an upper node of the eNode B in some cases. In particular, in a network constructed with a plurality of network nodes including an eNode B, it is apparent that various operations performed for communication with a user equipment can be performed by an eNode B or other networks except the eNode B. 'eNode B (eNB)' may be substituted with such a terminology as a fixed station, a Node B, a base station (BS), an access point (AP) and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor.

The memory unit is provided within or outside the processor to exchange data with the processor through the various means known in public.

Detailed explanation on the preferred embodiment of the present invention disclosed as mentioned in the foregoing description is provided for those in the art to implement and execute the present invention. While the present invention has been described and illustrated herein with reference to the preferred embodiments thereof, it will be apparent to those skilled in the art that various modifications and variations can be made therein without departing from the spirit and scope of the invention. For instance, those skilled in the art can use each component described in the aforementioned embodiments in a manner of combining it with each other. Hence, the present invention may be non-limited to the aforementioned embodiments of the present invention and intends to provide a scope matched with principles and new characteristics disclosed in the present invention.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

The present invention can be used for a wireless communication device such as a terminal, a relay, a base station and the like.

What is claimed is:

1. A method of reporting CSI (channel status information) by a user equipment (UE) to a base station in a wireless access system, the method comprising:
receiving information on a first CSI process and a second CSI process, each of which contains two or more CSI-RS (channel status information-reference signal) resources, through an upper layer; and
transmitting a first CSI report according to one of the two or more CSI-RS resources contained in the first CSI process and a second CSI report according to one of the two or more CSI-RS resources contained in the second CSI process to the base station,
wherein, when the second CSI process is configured to have an RI value identical to an RI (rank indicator) of the first CSI process, the number of antenna ports of all CSI-RS resources contained in the first CSI process is identical to the number of antenna ports of all CSI-RS resources contained in the second CSI process.

2. The method of claim 1, wherein independent beamforming is applied to each of the two or more CSI-RS resources.

3. The method of claim 1, further comprising:
receiving information on a CSI reporting type via the upper layer,
wherein the CSI reporting type comprises information on whether or not the two or more CSI-RS resources are aggregated.

4. The method of claim 3, wherein the CSI reporting type indicates that each of the two or more CSI-RS resources corresponds to an independent channel which is not combined.

5. The method of claim 1, wherein the first CSI process corresponds to a reference CSI process and wherein the second CSI process corresponds to a dependent CSI process of the reference CSI process.

6. The method of claim 1, wherein a restriction RI set is common to all CSI-RS resources contained in the first CSI process and the second CSI process.

7. A user equipment (UE) estimating a channel in a wireless communication system, comprising:
an RF (radio frequency) unit configured to transceive a signal with a base station; and
a processor configured to process the signal, the processor configured to set a first CSI process and a second CSI process, each of which contains two or more CSI-RS (channel status information-reference signal) resources, through an upper layer, the processor configured to control the RF unit to transmit a first CSI report according to one of the two or more CSI-RS resources contained in the first CSI process and a second CSI report one of the two or more CSI-RS resources contained in the second CSI process to the base station,
wherein, when the second CSI process is configured to have an RI value identical to an RI (rank indicator) of the first CSI process, the number of antenna ports of all CSI-RS resources contained in the first CSI process is identical to the number of antenna ports of all CSI-RS resources contained in the second CSI process.

8. The UE of claim 7, wherein independent beamforming is applied to each of the two or more CSI-RS resources.

9. The UE of claim 7, wherein the processor is configured to set a CSI reporting type via the upper layer and wherein the CSI reporting type comprises information on whether or not the two or more CSI-RS resources are aggregated.

10. The UE of claim 9, wherein the CSI reporting type indicates that each of the two or more CSI-RS resources corresponds to an independent channel which is not combined.

11. The UE of claim 7, wherein the first CSI process corresponds to a reference CSI process and wherein the second CSI process corresponds to a dependent CSI process of the reference CSI process.

12. The UE of claim 7, wherein a restriction RI set is common to all CSI-RS resources contained in the first CSI process and the second CSI process.

* * * * *